United States Patent
Sim et al.

(10) Patent No.: US 9,654,312 B2
(45) Date of Patent: May 16, 2017

(54) LAYERED DETECTION METHOD AND APPARATUS FOR QAM-FBMC SYSTEM

(71) Applicants: Samsung Electronics Co., Ltd., Gyeonggi-do (KR); Industry-Academic Cooperation Foundation, Yonsei University, Seoul (KR)

(72) Inventors: Dongkyu Sim, Gyeonggi-do (KR); Chungyong Lee, Seoul (KR); Taeyoung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 12 days.

(21) Appl. No.: 14/802,540

(22) Filed: Jul. 17, 2015

(65) Prior Publication Data

US 2016/0021556 A1    Jan. 21, 2016

(30) Foreign Application Priority Data

Jul. 18, 2014  (KR) .................. 10-2014-0090780

(51) Int. Cl.
| | | |
|---|---|---|
| *H04B 1/10* | (2006.01) | |
| *H04B 15/00* | (2006.01) | |
| *H04L 25/03* | (2006.01) | |
| *H04J 11/00* | (2006.01) | |
| *H04L 25/02* | (2006.01) | |

(52) U.S. Cl.
CPC .... *H04L 25/03159* (2013.01); *H04J 11/0023* (2013.01); *H04L 25/024* (2013.01); *H04L 25/0224* (2013.01)

(58) Field of Classification Search
CPC .......... H04L 25/03159; H04L 25/0224; H04L 25/024; H04L 27/1525; H04L 27/34; H04J 11/0023
See application file for complete search history.

(56) References Cited

U.S. PATENT DOCUMENTS

2013/0142218 A1* 6/2013 Moradi .................. H04B 1/707
                                                        375/135
2016/0211999 A1* 7/2016 Wild ...................... H04L 27/264

FOREIGN PATENT DOCUMENTS

CN            101860497          10/2010

* cited by examiner

*Primary Examiner* — Nguyen Vo
(74) *Attorney, Agent, or Firm* — McAndrews, Held & Malloy, Ltd.

(57) ABSTRACT

The present invention relates to a frequency region equalization method and an apparatus therefor in a cellular environment on the basis of a QAM-FBMC system. A method for receiving a signal by a receiver according to one embodiment of the present invention may include: performing channel estimation; comparing a minimum channel gain with a predetermined first threshold value; and performing layered detection when the minimum channel gain is smaller than the first threshold value. According to one embodiment of the present invention, a gain can be acquired in terms of a BER even while a structure of a symbol level equalizer is maintained.

20 Claims, 18 Drawing Sheets

LAYERED DETECTION METHOD AND APPARATUS FOR QAM-FBMC SYSTEM

CROSS-REFERENCE TO RELATED APPLICATION

This application claims priority from and the benefit under 35 U.S.C. §119(a) of Korean Patent Application No. 10-2014-0090780, filed on Jul. 18, 2014, which is hereby incorporated by reference for all purposes as if fully set forth herein.

BACKGROUND

1. Field of the Invention

The present invention relates to a method of equalizing a frequency domain in a cellular environment based on a Quadrature Amplitude Modulation (QAM) Filter-Bank Multi-Carrier (FBMC) system, and an apparatus therefor.

2. Description of the Prior Art

From among multi-carrier transmission methods, a QAM-based FBMC system corresponds to a frequency domain equalization method for improving a Bit Error Rate (BER) performance while maintaining an M-tap equalizer structure.

In this case, a QAM-FBMC transmission/reception method can separate M subcarriers into even-numbered subcarriers and odd-numbered subcarriers and then transmit and receive a signal through two different filters satisfying the orthogonality between a time axis and a frequency axis. In this case, it can be specified that a filter coupled to an even-numbered subcarrier is referred to as a first filter or an even filter and a filter coupled to an odd-numbered subcarrier is referred to a second filter or an odd filter. In this case, two filters, i.e. the first filter and the second filter, have the orthogonality, thereby enabling the transmission and reception of a QAM signal.

SUMMARY

An aspect of the present invention is to provide a frequency domain equalization method and an apparatus therefor in a cellular environment on the basis of a QAM-FBMC system.

Further, another aspect of the present invention is to provide a method for applying an interference cancellation method in order to have a structure of a symbol level equalizer and remove a burst error.

Further, another aspect of the present invention is to provide a method for adaptively applying an equalization method and an interference cancellation region according to a channel gain, and an apparatus therefor.

The technical subjects pursued in the present invention may not be limited to the above mentioned technical subjects, and other technical subjects which are not mentioned may be clearly understood, through the following descriptions, by those skilled in the art of the present invention.

In order to achieve the above-described aspects, a method of receiving a signal by a receiver is provided. The method may include: performing channel estimation; comparing a minimum channel gain with a predetermined first threshold value; and performing layered detection when the minimum channel gain is smaller than the first threshold value.

Further, the performing of the layered detection may further include performing interference cancellation-based detection for a second layer corresponding to a region having a channel gain smaller than a predetermined second threshold value.

Further, the performing of the layered detection may further include performing detection for a first layer corresponding to a region having the channel gain larger than the second threshold value, using a one-tap equalizer.

Further, the performing of the interference cancellation detection may further include: ordering subcarriers corresponding to the second layer by a Signal to Interference Ratio (SIR); and sequentially performing successive interference cancellation for the ordered subcarriers corresponding to the second layer in an order from a subcarrier having a large SIR.

Further, the performing of the layered detection may further include cancelling interference affecting the second layer, using the subcarriers detected from the first layer.

Further, the first threshold value is configured according to the following equation, $$E[SIR] = 10\log\left\{\frac{E[\min(|H_{(m,m),n}|^2)]}{\rho_s}\right\} \Rightarrow \rho_s = \frac{E[\min(|H_{(m,m),n}|^2)]}{10^{\frac{E[SIR]}{10}}}$$

wherein it can be known that E[SIR] denotes an average SIR, E[min(|H(m,n),n|²)] denotes a minimum channel gain, and $\rho_s$ denotes the first threshold value.

Further, the second threshold value is configured according to the following equation, $$\rho_R = \alpha\rho_s, \text{ where } \alpha = \frac{\max(|H_{(m,m),n}|^2)}{\min(|H_{(m,m),n}|^2)}$$

wherein min(|H(m,m),n|²) denotes a minimum channel gain, max(|H(m,m),n|²) denotes a maximum channel gain, $\rho_s$ denotes the first threshold value, and $\rho_R$ denotes the second threshold value.

Further, the method for receiving a signal may further include: performing channel estimation; selecting an optimal filter type according to the estimated channel state; and transmitting information on the selected filter to a transmitter.

Further, the comparing of the minimum channel gain with the first threshold value may further include configuring the first threshold value, using the information on the filter.

Further, the method for receiving a signal may further include performing detection using a one-tap equalizer, when the minimum channel gain is not smaller than the first threshold value.

Further, a receiver according to one embodiment of the present invention for achieving the purpose described above may include: a communication unit for transmitting and receiving a signal to/from a transmitter; a control unit for performing channel estimation, comparing a minimum channel gain with a predetermined first threshold value, and controlling to perform layered detection when the minimum channel gain is smaller than the first threshold value.

According to one embodiment of the present specification, a method of equalizing a frequency domain in a cellular environment based on a QAM-FBMC system and an apparatus therefor can be provided.

Further, a method for applying an interference cancellation method in order to have a structure of a symbol level equalizer and remove a burst error can be provided.

Further, a method for adaptively applying an equalization method and an interference cancellation region according to a channel gain and an apparatus therefor can be provided.

Further, according to one embodiment of the present invention, it can be known that a method for transmitting and receiving a signal is a method capable of acquiring a gain in terms of BER even while maintaining a structure of a symbol level equalizer.

Effects obtainable from the present invention may not be limited to the above mentioned effects, and other effects which are not mentioned may be clearly understood, through the following descriptions, by those skilled in the art of the present invention.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Hereinafter, an embodiment of the present specification will be described with reference to the accompanying drawings.

In describing embodiments of the present disclosure, a description of technical details that are well-known in the art to which embodiments of the present disclosure pertains and are not directly associated with embodiments of the present disclosure will be omitted. The purpose of this is to avoid unnecessary descriptions, thereby more clearly providing the subject matter of embodiments of the present disclosure without making the subject matter obscure.

In the following description of embodiments of the present disclosure, a detailed description of known functions or configurations incorporated herein will be omitted when it is determined that the detailed description may unnecessarily obscure the subject matter of embodiments of the present disclosure. Hereinafter, embodiments of the present disclosure will be described with reference to the accompanying drawings. Meanwhile, terms described later are defined in consideration of the functions of the present disclosure, but the meaning of the terms may be changed according to a user, intention of an operator, or convention. Accordingly, the terms should be defined based on the contents over the whole present specification.

Figure 1:
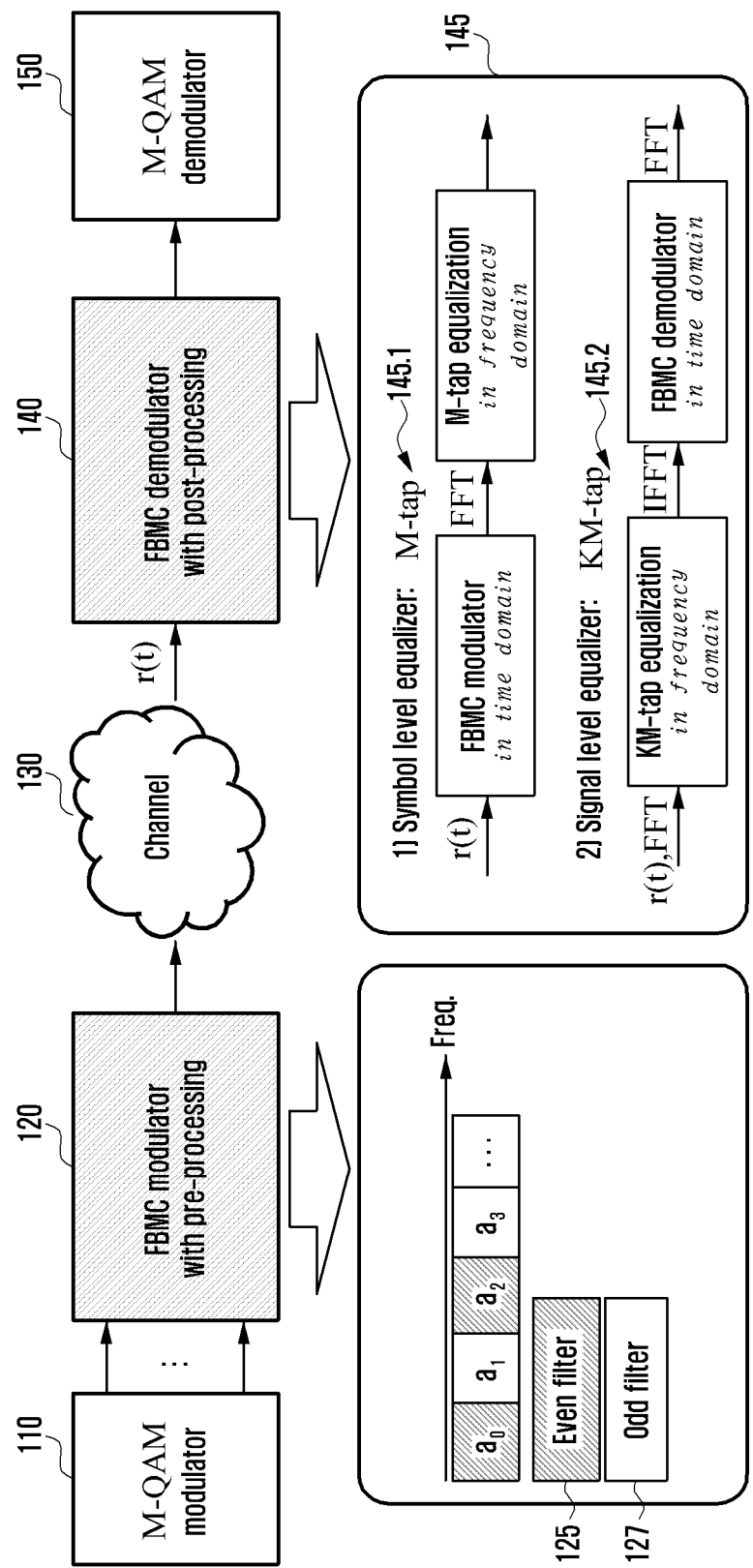
FIG. 1 is a view schematically illustrating a method for transmitting and receiving a signal by a QAM signal-based FBMC system.

FIG. 1 is a view schematically illustrating a method for transmitting and receiving a signal by a QAM signal-based FBMC system.

Referring to FIG. 1, a QAM signal-based FBMC system can separate M subcarriers into even-numbered subcarriers and odd-numbered subcarriers, and transmit and receive a signal through two different filters satisfying the orthogonality between a time axis and a frequency axis. In this case, the two different filters, e.g., an even filter or a first filter 125, and an odd filter, or a second filter 127, have a characteristic of being orthogonal to each other, thereby enabling the transmission and reception of a QAM signal.

That is, a transmitter, which may include an M-QAM modulator 110 feeding a plurality of modulated signals into a FBMC modulator pre-processor 120) can transmit the even-numbered subcarriers through the first filter 125, and can transmit the odd-numbered subcarriers through the second filter 127. Further, a signal transmitted by the transmitter can be received by a receiver through a channel 130. In the embodiment shown, the receiver may exemplarily include a FBMC demodulator post-processor 140 and an M-QAM demodulator 150. In this case, the receiver can perform a one-tap frequency-domain equalization identical to that of Orthogonal Frequency Division Multiplexing (OFDM) system in order to compensate for a distortion by the channel 130 as well as filtering. However, since a FBMC system additionally performs a filtering process unlike an OFDM system, two types of an equalizer structure are possible.

The FBMC demodulator post-processor 140 may involve one or more different processes. For example, as illustrated by processes 145 of FIG. 1, a first structure may be a structure for performing equalization in a frequency region, after performing filtering in a time domain in advance. In this case, the first structure has an M-tap equalization structure identical to that of the OFDM system. In this way, in a case where an equalizing process is performed in the frequency domain after filtering is preferentially performed in the time domain, since one-tap equalization is performed for filtered symbols, the first structure can be called a symbol level equalizer 145.1. In case of the symbol level equalizer described above, equalization is performed in a frequency domain after a Fast Fourier Transform (FFT) is performed after filtering is performed in a time domain. In case of such a structure of the symbol level equalizer, since a size of the FFT is confined to M and a transform between time and frequency domains is performed only once, the structure of the symbol level equalizer has complexity identical to that of the OFDM system.

Meanwhile, a second structure is a structure for performing filtering in a time domain after performing equalization in a frequency domain in advance. In this case, since one-tap equalization is performed in a signal level in which filtering has not yet been performed, the second structure can be called a signal level equalizer 145.2. In case of the signal level equalizer described above, before filtering is performed in a time domain, equalization can be performed in a frequency domain after the FFT is performed for a reception signal. Thereafter, the receiver can perform an Inverse Fast Fourier Transform (IFFT) to perform filtering in a time domain, and can perform the FFT for a filtered signal again. In case of such a signal level equalizer, the signal level equalizer has a structure for repeating a transform between time and frequency domains three times, but the signal level equalizer can configure a KM-tap equalizer structure by reflecting an oversampled characteristic of the FBMC system.

Figure 2:
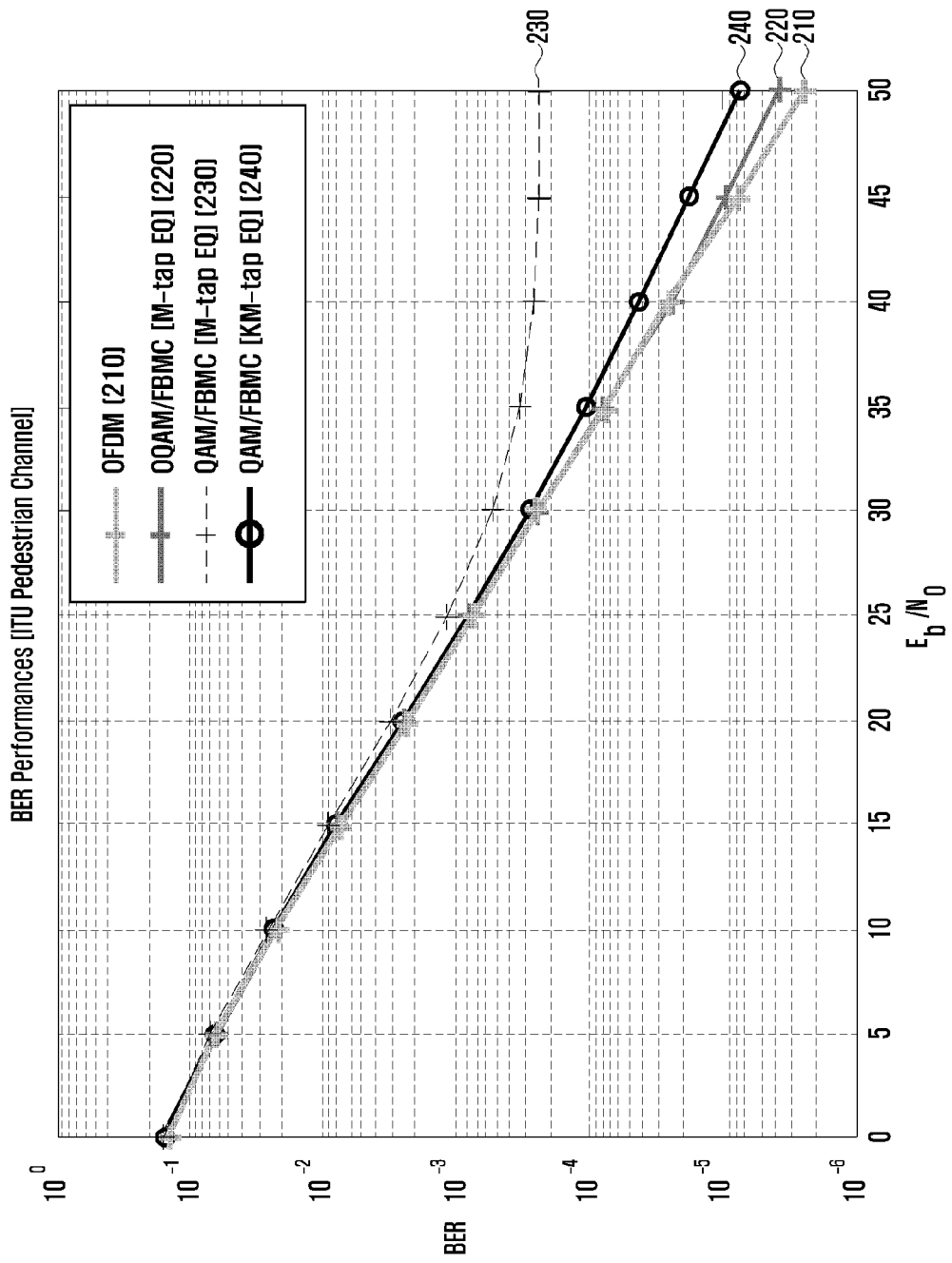
FIG. 2 is a view illustrating one example of bit error rate performance according to an equalizer structure for a method for transmitting and receiving a signal by a QAM signal-based FBMC system.

FIG. 2 is a view illustrating one example of a bit error rate (BER) performance according to an equalizer structure for a method for transmitting and receiving a signal by a QAM signal-based FBMC system.

FIG. 2 illustrates a bit error rate (BER) performance with an OFDM process as illustrated by reference numeral 210, and a BER performance with an OQAM/FBMC process as illustrated by reference numeral 220. In a case of a symbol level equalizer (e.g., the symbol level equalizer of the processes 145.1 of FIG. 1), as illustrated by reference numeral 230 of FIG. 2, since the symbol level equalizer does not reflect an oversampled characteristic of the FBMC system, degradation may be severe in an environment having a strong delay spread.

On the other hand, a signal level equalizer (e.g., the signal level equalizer of the processes 145.2 of FIG. 1) has an advantage capable of reflecting an oversampled characteristic of the FBMC system due to the characteristics of the structure thereof. That is, as illustrated by reference numeral 240 of FIG. 2, performance degradation almost may not occur even in an environment having a strong delay spread. But, in case of the signal level equalizer, filtering should be performed by converting into a signal in a time domain again after equalization is performed in a frequency domain. Thus, a transform between time-frequency domains should be repeatedly performed. Further, the complexity may largely increase. For example, a size of the FFT also may increase in proportion to an order of a filter in order to reflect an oversampled characteristic.

Hereinafter, a frequency domain equalization method suitable for the QAM signal-based FBMC system and an apparatus therefor will be described. More specifically, a method for basically having a structure of the symbol level equalizer and applying interference cancellation for removing a burst error which becomes a cause of performance degradation will be described. Further, an equalization method for applying a layered detection scheme for removing a burst error caused by residual interference in an environment having a strong delay spread will be described. In this case, a method for selectively using M-tap equalization detection and layered detection according to a selection threshold value and adaptively determining a region in which interference cancellation is to be performed according to a region threshold value will be described. Further, a method for transmitting a Filter Indicator (FI) to the transmitter by the receiver in order to use a filter suitable for a current channel state will be described. Further, a method for configuring a threshold value of layered detection by the receiver on the basis of a filter determined by the FI will be described.

In case of the QAM signal-based FBMC system, a Cyclic Prefix (CP) does not exist unlike the OFDM system. Thus, in case of the QAM-FBMC system, Inter-Symbol Interference (ISI) can exist in a delay spread environment. Further, such an ISI can affect an Inter-Carrier Interference (ICI) according to a frequency confinement characteristic of a filter in a frequency domain. A reception signal considering such an influence can be defined by Equation (1) as follows.

$$Y_{m_0,n_0} = H_{(m_0,m_0),n_0} X_{m_0,n_0} + \sum_{\substack{n=-\infty \\ n \neq n_0}}^{\infty} \sum_{\substack{m=0 \\ m \neq m_0}}^{M-1} H_{(m,m_0),n} X_{m,n} + N_{m_0,n_0} \quad (1)$$

In this case, $Y_{(m_0,n_0)}$ denotes an actually-received signal, $H_{(m_0,m_0),n_0} X_{m_0,n_0}$ denotes a desired signal, and $$\sum_{\substack{n=-\infty \\ n \neq n_0}}^{\infty} \sum_{\substack{m=0 \\ m \neq m_0}}^{M-1} H_{(m,m_0),n} X_{m,n}$$

denotes an interference signal. Further, $m_0$ denotes an index of a desired frequency, and $n_0$ denotes an index of a desired time. Further, $N_{m_0,n_0}$ denotes noise.

Further, a Signal to Interference Ratio (SIR) of the reception signal can be defined by Equation (2) as follows.

$$SIR = \frac{|H_{(m_0,m_0),n_0} X_{m_0,n_0}|^2}{\sum_{\substack{n=-\infty \\ n \neq n_0}}^{\infty} \sum_{\substack{m=0 \\ m \neq m_0}}^{M-1} |H_{(m,m_0),n} X_{m,n}|^2} \quad (2)$$

When an average SIR for an International Telecommunication Union (ITU) pedestrian channel is calculated on the basis of Equation (2) mentioned above, the average SIR can be shown Table 1 as follows.

TABLE 1

|  | Even-Even | Even-Odd | Odd-Odd |
|---|---|---|---|
| SIR | about 45 dB | about 38 dB | about 20 dB |

As shown in Table 1, a SIR between even-numbered subcarriers may be about 45 dB, a SIR between even-numbered and odd-numbered subcarriers may be about 38 dB, and a SIR between odd-numbered subcarriers may be about 20 dB. In this way, it can be identified that a main cause of performance degradation under a delay spread environment is interference between odd-numbered subcarriers to which a SIR is most vulnerable.

Entire channels in a frequency domain can be defined by Equation (3) as follows in order to solve a problem of such a residual interference.

$$H_{(m_k,m_j),n} = H_{(m_k,m_j),n}^{PHY} \rho_{(m_k,m_j),n} \quad (3)$$

In this case, $H^{PHY}$ denotes a physical channel, and P denotes a frequency response of a filter.

Through Equation (3) described above, it can be known that the response of the filter dominantly affects between adjacent subcarriers, while the physical channel dominantly affects between far subcarriers. That is, in the case of the FBMC system widely affected by the ICI, it can be known that a minimum value of a physical channel gain has a very significant influence on performance. Therefore, in a case where a definite channel gain is not guaranteed in the FBMC system, detection for a particular subcarrier interval by the ICI may be impossible. Therefore, an interference cancellation method needs to be applied in order to control a burst error which occurs when a channel gain is low in a structure of the symbol level equalizer.

Figure 3:
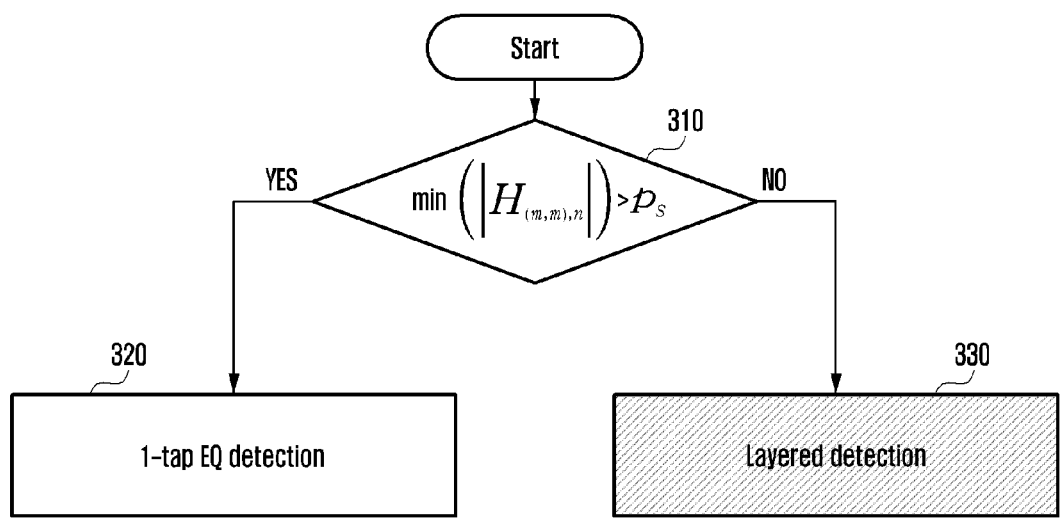
FIG. 3 is a flow chart illustrating a method of detecting equalization according to one embodiment of the present invention.

FIG. 3 is a view illustrating a flow chart for a method for detecting equalization according to one embodiment of the present invention.

Referring to FIG. 3, an equalizer according to one embodiment of the present invention can determine an equalization scheme according to a channel gain. More specifically, as described above, a main cause of performance degradation under a structure of the symbol level equalizer may be a burst error when a channel gain is low. Therefore, the equalizer according to the embodiment of the present invention can determine an equalization scheme according to a channel gain.

That is, it can be determined whether a minimum value of a desired channel gain is higher than a predetermined threshold value in step 310. In this case, the threshold value is referred to as a selection threshold value $\rho_s$. But, the selection threshold value $\rho_s$ is only a term for convenience. When a threshold value is a predetermined threshold value for performing comparison with a channel gain in order to select an equalization scheme, the predetermined threshold value can be applied to this case regardless of the term. According to the need, the selection threshold value $\rho_s$ can be expressed as a first threshold value and the like.

In a case where a result of the determination shows that the minimum value of the channel gain is larger than the selection threshold value $\rho_s$ in step 310, detection can be performed on the basis of a one-tap equalizer in step 320. Meanwhile, in a case where the minimum value of the channel gain according to an embodiment is larger than or equal to the selection threshold value $\rho_s$, detection may be performed on the basis of the one-tap equalizer.

On the other hand, in a case where the minimum value of the channel gain is smaller than or equal to the selection threshold value $\rho_s$, detection can be performed on the basis of interference cancellation in step 330. Otherwise, in a case where the minimum value of the channel gain according to an embodiment is smaller than the selection threshold value $\rho_s$, detection may be performed on the basis of the interference cancellation. Meanwhile, detection based on the interference cancellation has a layered structure in consideration of the FBMC system in which a burst error occurs. That is, a successive interference cancellation can be performed only for not every subcarrier region but a region corresponding to a particular layer. In this case, the term "the layer" denotes a term for comparing a channel gain with at least one threshold value to distinguish a region having the channel gain larger than the threshold value from a region having the channel gain smaller than or equal to the threshold value (or a region having the channel gain larger than or equal to the threshold value and a region having the channel gain smaller than the threshold value). For example, a region having a channel gain larger than the first threshold value can be referred to as a first layer (a $1^{st}$ layer), and a region having a channel gain smaller than or equal to the first threshold value can be referred to as a second layer (a $2^{nd}$ layer). Further, in this case, in order to configure a region for performing the successive interference cancellation, the threshold value for comparing with a channel gain can be referred to as, say, a region threshold value $\rho_R$. But, the region threshold value $\rho_R$ is only a term for convenience. When a threshold value is a predetermined threshold value for comparing with a channel gain in order to perform the successive interference cancellation, the predetermined threshold value can be applied to this case regardless of the term. According to the need, the region threshold value $\rho_R$ can be expressed as a second threshold value and the like. Further, the terms "the first layer" and "the second layer" are terms for comparing a channel gain with a region threshold value to distinguish the channel gain from the region threshold value, and the terms "the first layer" and "the second layer" can be distinguished, say, by the terms "an A layer" and "a B layer".

Accordingly, detection can be performed for subcarriers corresponding to the first layer (or the $1^{st}$ layer) which exceeds the region threshold value $\rho_R$, using the one-tap equalizer. Further, interference cancellation-based detection can be performed for all other subcarriers, e.g., the subcarriers corresponding to the second layer smaller than or equal to the region threshold value $\rho_R$. In this case, in case of the second layer (or the $2^{nd}$ layer), the successive interference cancellation is performed after ordering by a SIR is performed according to an embodiment, thereby enabling minimizing error propagation. Specific description about mentioned-above will be described below.

Figure 4:
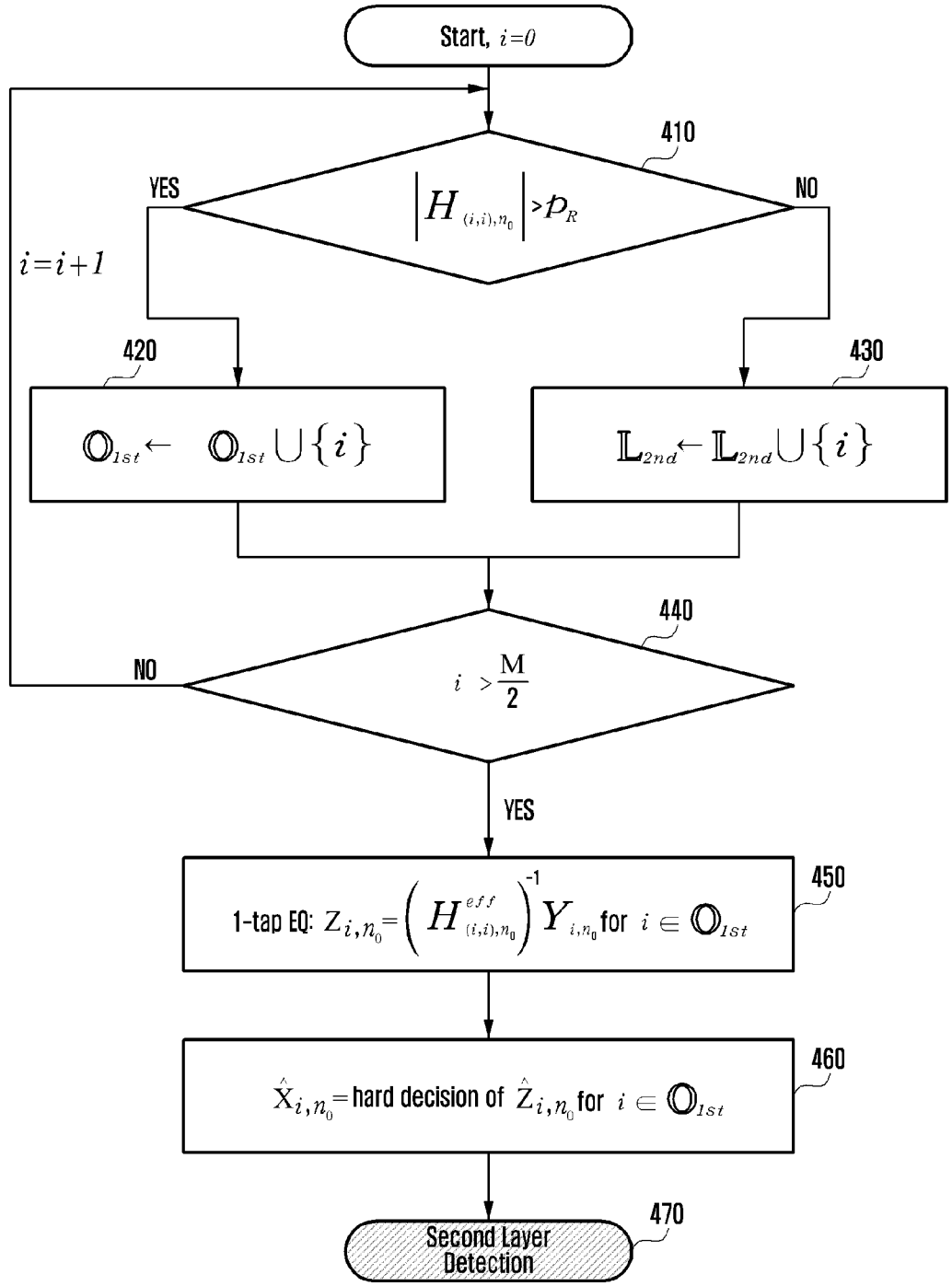
FIGS. 4 and 5 are flow charts illustrating an interference cancellation-based detection method according to one embodiment of the present invention.
Figure 5:
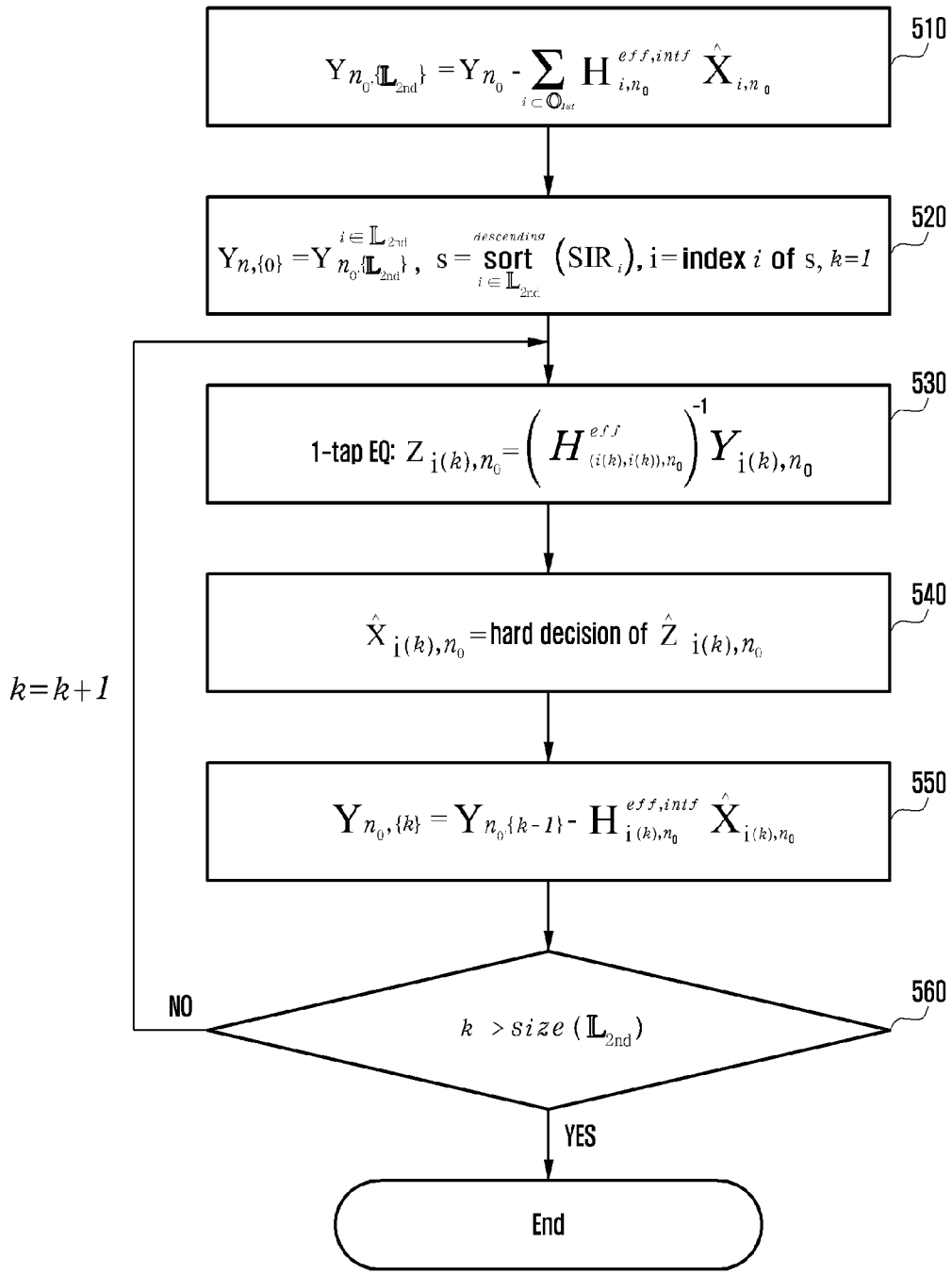
Figure 6:
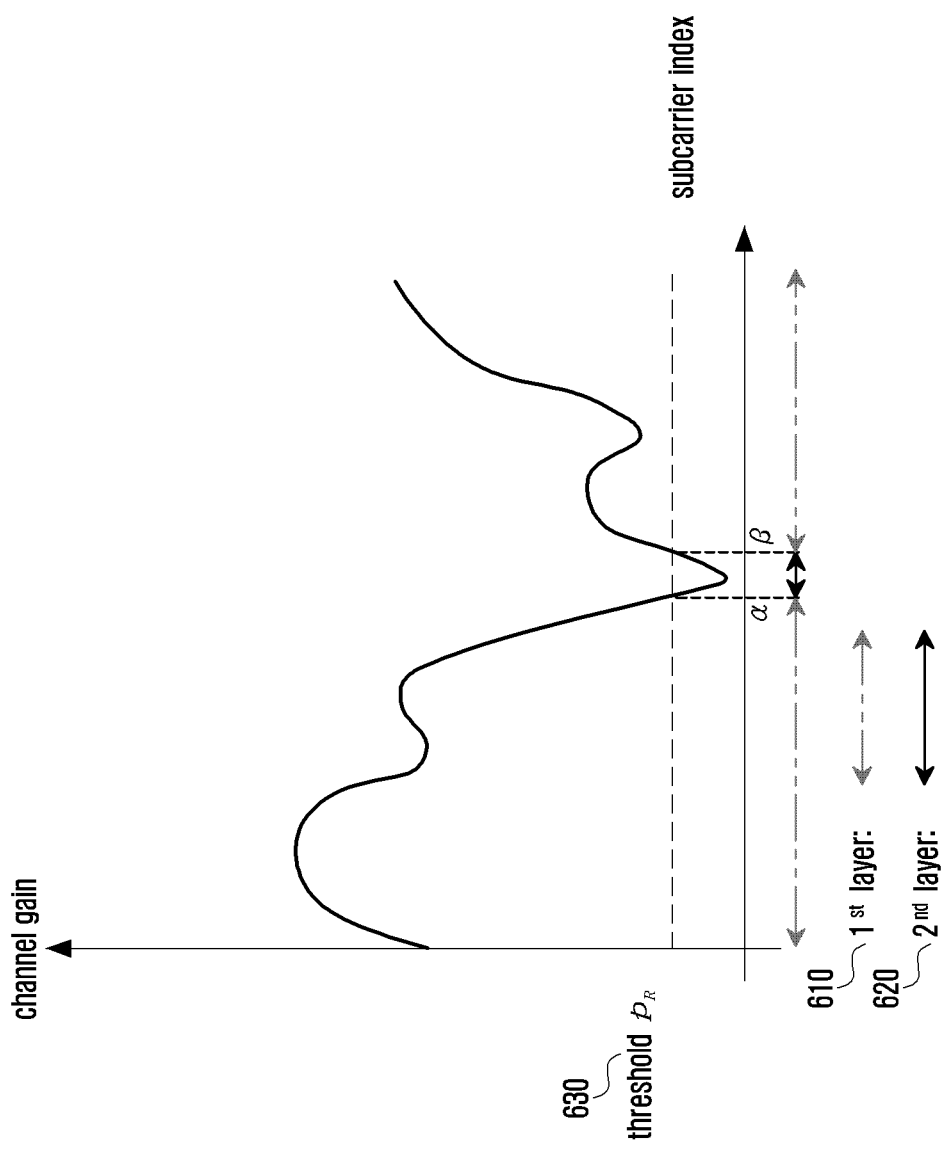
FIG. 6 is a view illustrating one example of layer classification according to a region threshold value according to one embodiment of the present invention.

FIGS. 4 and 5 are flow charts illustrating an interference cancellation-based detection method according to one embodiment of the present invention. Further, FIG. 6 is a view illustrating one example of layer classification according to a region threshold value according to one embodiment of the present invention.

In this case, flow charts illustrated in FIGS. 4 and 5 are views specifically illustrating step 330 (of FIG. 3) in which interference cancellation-based detection is performed, when a result of the determination shows that a minimum value of a channel gain is smaller than or equal to the selection threshold value $\rho_s$ in step 310 (of FIG. 3).

Referring to FIG. 4, the receiver can compare all channel gains with the region threshold value $\rho_R$ in step 410. That is, the receiver can compare all channel gains with the region threshold value $\rho_R$ in order to choose subcarriers corresponding to the second layer which is to perform the successive interference cancellation.

In a case where a result of the comparison shows that a channel gain is larger than the region threshold value $\rho_R$ (or in a case where the channel gain is larger than or equal to the region threshold value $\rho_R$ according to an embodiment) as determined in step 410, the receiver can select a subcarrier corresponding to the case as the first layer in step 420. On the other hand, in a case where a channel gain is smaller than or equal to the region threshold value $\rho_R$ (or in a case where the channel gain is smaller than the region threshold value $\rho_R$ according to an embodiment) as determined in step 410, the receiver can select a subcarrier corresponding to the case as the second layer in step 430.

That is, referring to FIG. 6, the receiver can select a subcarrier of a region in which a channel gain is larger than the region threshold value $\rho_R$ as a first region 610 by comparing the channel gain with the region threshold value $\rho_R$, i.e., less than α or greater than β. Further, the receiver can select a subcarrier of a region in which a channel gain is smaller than the region threshold value $\rho_R$ as a second region 620, i.e., between α and β.

Referring back to FIG. 4, the receiver can determine whether the channel gain has been compared to the region threshold value $\rho_R$ for the entire subcarriers in step 440. In a case where a result of the determination shows that layer selection is not completed for the entire subcarriers, the receiver can return to step 410 to perform the layer selection for a next subcarrier. Meanwhile, since such a layer selection has to be performed for only odd-numbered subcarriers, the receiver can perform comparison only for a half of the number of the entire subcarriers according to an embodiment.

Thereafter, in a case where layer selection for the entire subcarriers is completed as determined in step 440, the receiver can detect subcarriers corresponding to the first layer, using the one-tap equalizer in step 450 and step 460. Since the detection is similar to detection of subcarriers using a conventional one-tap equalizer and a performance method therefor, the detailed description will be omitted.

Further, the receiver can perform interference cancellation-based detection for the rest of the second layer in step 470. The interference cancellation-based detection will be specifically described with reference to FIG. 5.

Referring to FIG. 5, the receiver can cancel interference affecting the second layer on the basis of symbols of the first layer at one time in step 510. That is, in this case, the receiver does not cancel interference affecting the second layer due to subcarriers belonging to the first layer in the order of subcarriers belonging to the first layer, but the receiver can cancel interference caused by symbols of the first layer at one time.

Thereafter, the receiver can order symbols belonging to the second layer by a SIR in step 520. In this case, the order of step 510 and 520 may be switched according to an embodiment.

Thereafter, the receiver can detect a first symbol, using the one-tap equalizer in step 530 and step 540. Further, the receiver can cancel interference affecting the rest of subcarriers of the second layer due to the detected symbol in step 550. Also, the receiver can determine whether detection of all subcarriers belonging to the second layer has been completed in step 560, and can return to step 530 and detect a next symbol when the detection of all subcarriers is not completed. Also, the receiver can cancel interference caused by the detected symbol in step 550.

The successive interference cancellation-based detection mentioned above will be described in detail below.

Figure 7:
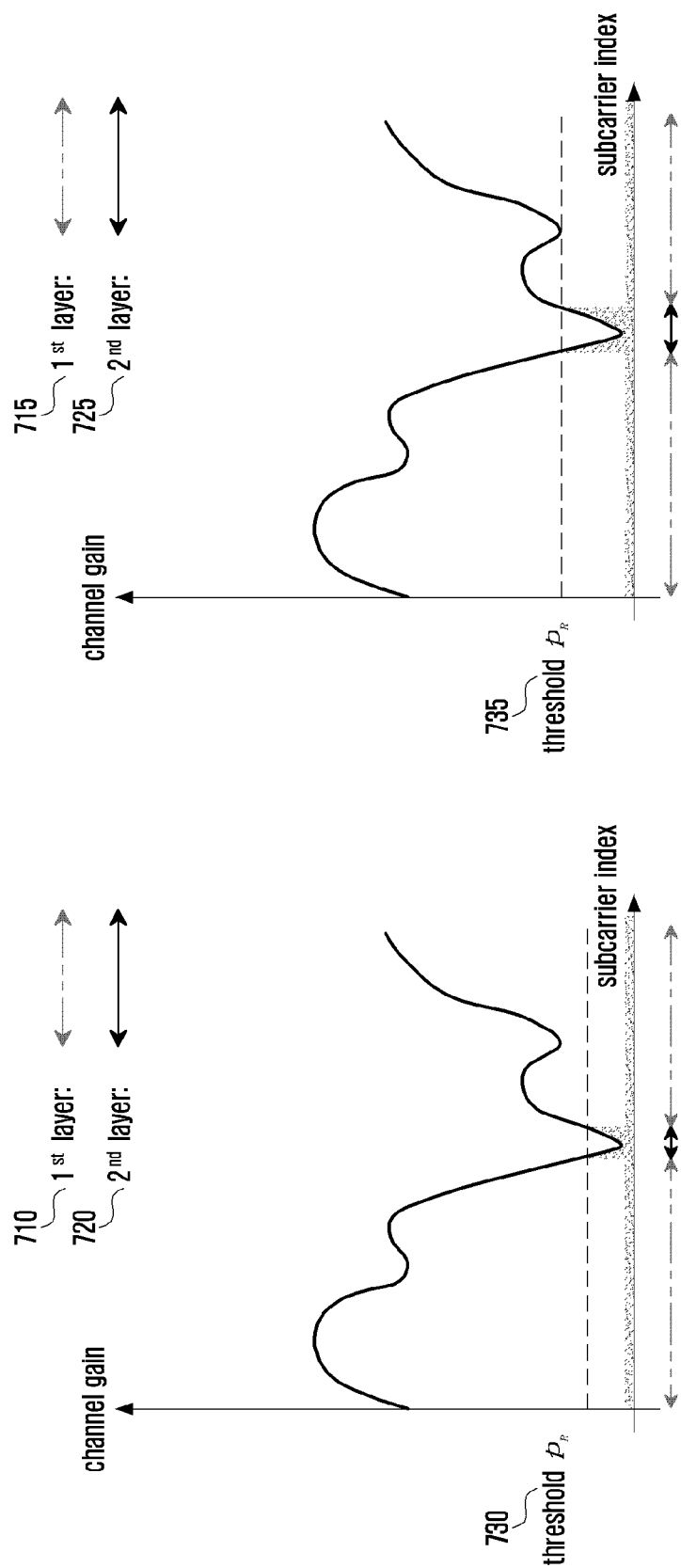
FIGS. 7A and 7B are views illustrating examples of a layer classification according to a change in region threshold value according to one embodiment of the present invention.

FIGS. 7A and 7B are views illustrating examples of a layer classification according to a change in region threshold value according to one embodiment of the present invention.

Referring to FIG. 7A, in a case where a frequency confinement characteristic of a filter is relatively good, a region threshold value $\rho_R$ 730 may become smaller due to an increase in an average SIR (e.g., relative to a first layer 710). Therefore, the number of symbols corresponding to a second layer 720 may be decreased.

On the other hand, referring to FIG. 7B, in a case where a frequency confinement characteristic of a filter is relatively bad, a region threshold value $\rho_R$ 735 may become larger due to a decrease in an average SIR (e.g., relative to a first layer 715). Therefore, the number of symbols corresponding to a second layer 725 may be increased compared to FIG. 7A.

Hereinabove, the equalization detection method according to one embodiment of the present invention has been described.

Hereinafter, a successive interference cancellation method according one embodiment of the present invention will be described more specifically.

Figure 8:
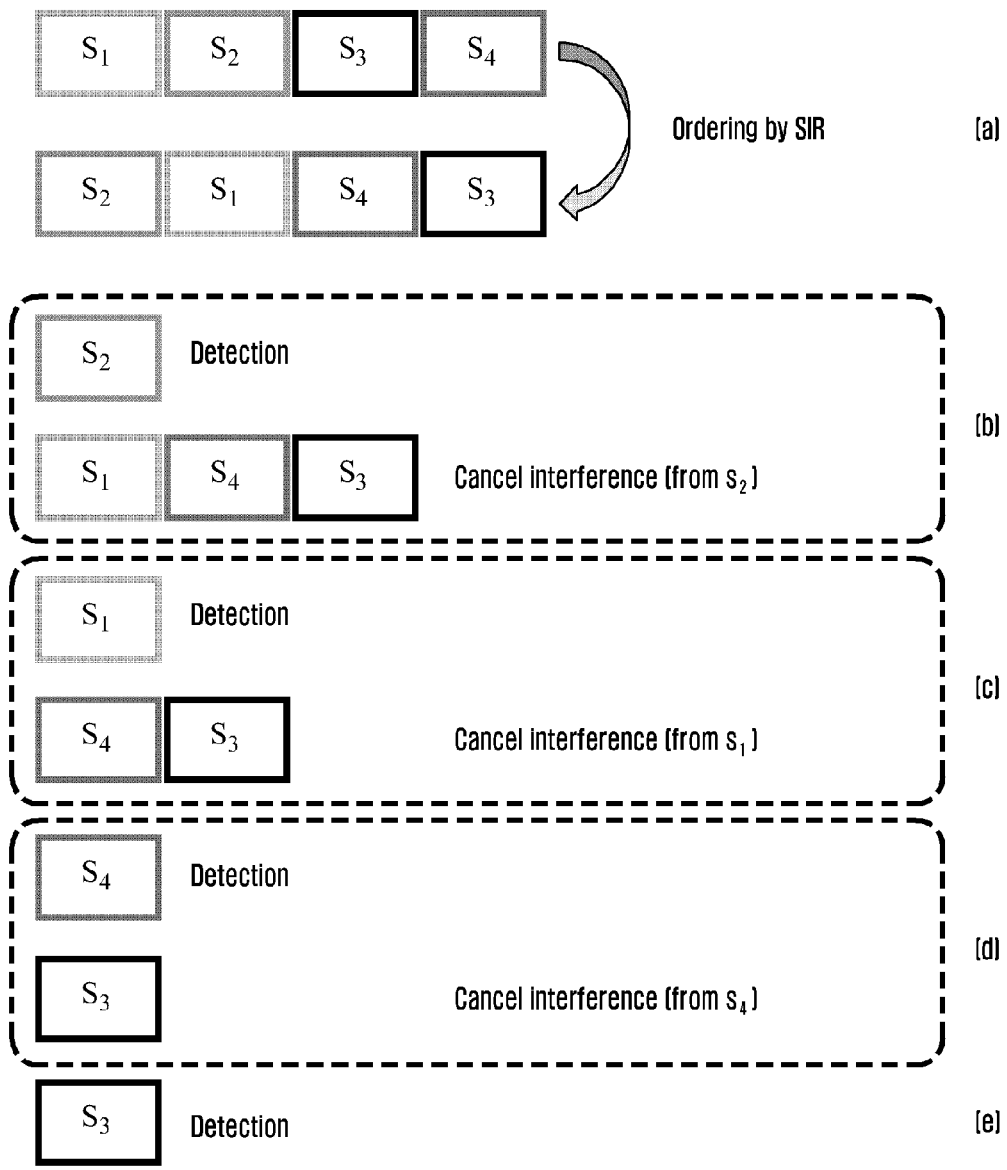
FIG. 8 is a view illustrating a concept of an ordered successive interference cancellation method.
Figure 9:
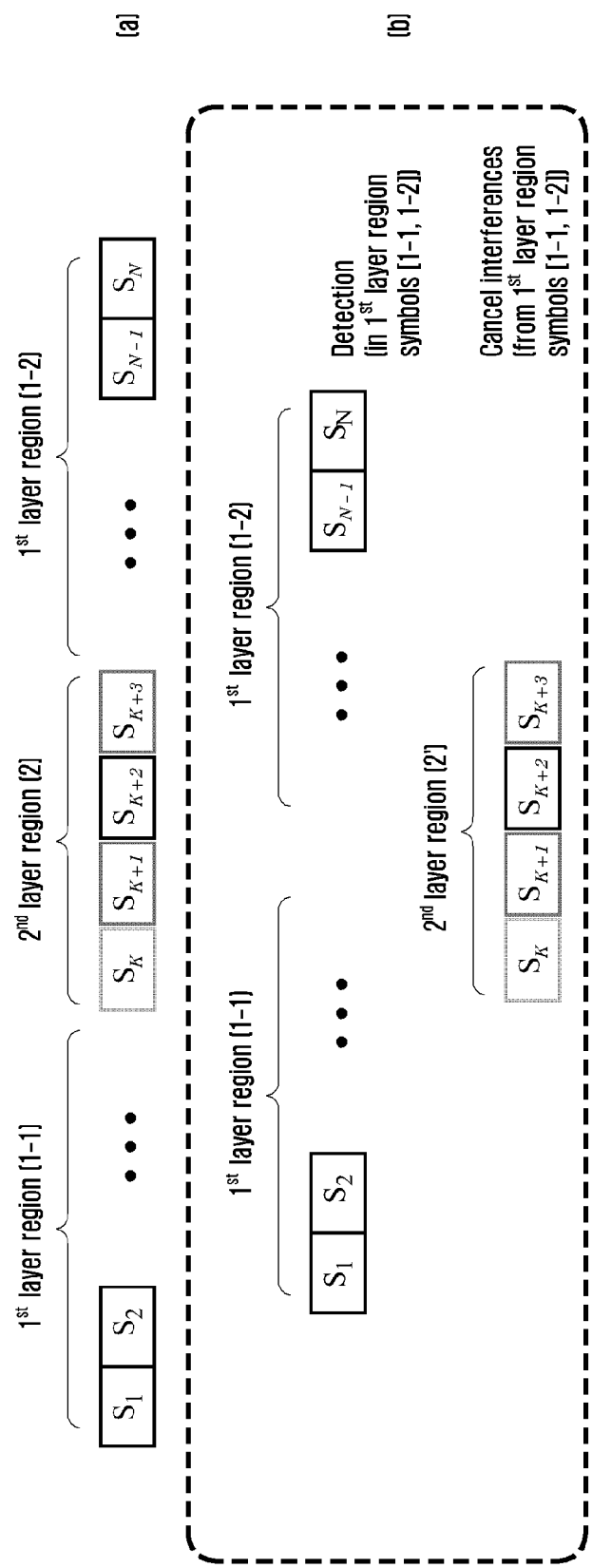
FIGS. 9 and 10 are views illustrating a concept of a successive interference cancellation method according to one embodiment of the present invention.
Figure 10:
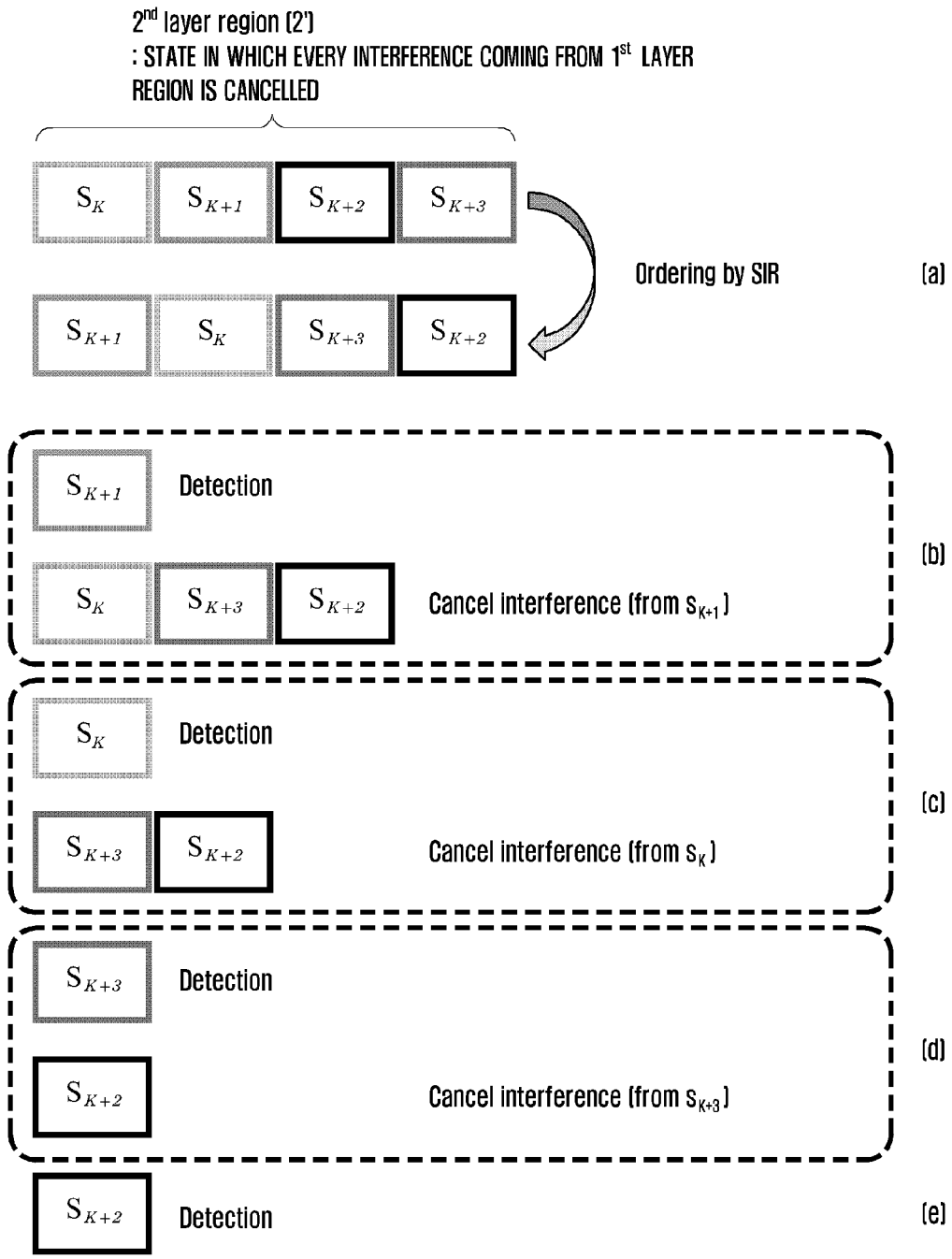

FIG. 8 is a view illustrating a concept of an ordered successive interference cancellation method. FIGS. 9 and 10 are views illustrating a concept of a successive interference cancellation method according to one embodiment of the present invention.

An Ordered Successive Interference Cancellation (OSIC)-based signal detection method can be used for cancelling inter-stream interference and Inter-Antenna Interference (IAI) in a Multiple-Input Multiple-Output (MIMO) system.

By the way, since the number of independent streams transmitted by the MIMO system is smaller than the number of transmission antennas, there is no huge burden on a sequential detection scheme. That is, the receiver can order an $n_{s,MIMO}$ number of streams by a Signal To Interference plus Noise Ratio (SINR) or SIR and then successively detect the ordered streams in the MIMO system. In this case, an $n_{s,MIMO}$ number of times of a sequential detection process and an $n_{s,MIMO}-1$ number of times of an interference cancellation process are required.

Referring to FIG. 8, in a case where four symbols exist as an example, the receiver can order the four symbols by a SIR in step (a).

Further, the receiver can perform detection of a symbol S2 having the largest SIR, and can cancel interference caused by the symbol S2 in the rest of symbols S1, S3 and S4 in step (b).

Thereafter, the receiver side can detect the symbol S1 having the second largest SIR, and can cancel interference caused by the symbol S1 in the symbols S3 and S4 in step (c). Further, the receiver can detect the symbol S4 having the third largest SIR, and can cancel interference caused by the symbol S4 in the symbol S3 in step (d). Lastly, the receiver can detect the rest of the symbol S3.

When the receiver performs sequential detection and interference cancellation for all symbols as described above, as many times of a detection process as the number of symbols, that is, an $n_{s,MIMO}$ number of times (four times in the example illustrated in FIG. 8) of a detection process is required. Further, an $n_{MIMO}-1$ number of times (three times in the example illustrated in FIG. 8) of an interference cancellation process is required.

By the way, the number of streams transmitted by the QAM-FBMC system ($n_{s,FBMC}$) is identical to the number of subcarriers ($n_{subcarrier}$) which are used in the MIMO system. In this case, since the number of streams becomes very large when the receiver applies the OSIC in order to solve the ICI of a FBMC, performing sequential detection of the entire streams, which is identical to the existing OSIC, can be a burden on the receiver. That is, when the receiver orders an $n_{s,FBMC}$ number of streams by a SINR and then sequentially detects the streams, an $n_{s,FBMC}$ number of times of a sequential detection process and an $n_{s,FBMC}-1$ number of times of an interference cancellation process are required. By the way, as described above, the number of streams transmitted by the FBMC system ($n_{s,FBMC}$) is much larger than the number of streams transmitted by the MIMO system ($n_{s,MIMO}$).

Therefore, the receiver can divide the entire subcarriers into at least subcarriers of two layers through the region threshold value $\rho_R$, and can perform parallel detection for the first layer using the one-tap equalizer instead of performing successive detection.

Further, before the receiver detects a region for the rest of the second layer, the receiver can perform sequential detection only after cancelling interference at one time using the streams detected in the first layer.

The number of intervals at which successive detection should be performed can be largely decreased through such a method. That is, when the receiver orders an $n_{s,2nd}$ number of streams by a SINR and then successively detects the ordered streams, an $n_{s,2nd}+1$ number of times of a sequential detection process and an $n_{s,2nd}$ number of times of an interference cancellation process are required.

Referring to FIG. 9, in the FBMC system, the receiver can divide symbols into subcarriers of first layers 1-1 and 1-2 and subcarriers of a second layer 2 by comparing the region threshold value $\rho_R$ with a channel gain in step (a).

Further, the receiver can perform parallel detection for symbols belonging to the first layers 1-1 and 1-2 in step (b). Further, the receiver can cancel interference affecting symbols belonging to the second layer 2 due to symbols belonging to the first layers 1-1 and 1-2 at one time.

Thereafter, referring to FIG. 10, the receiver can order symbols belonging to the second layer 2 by a SIR or SINR in step (a). In this case, as described above, in case of the symbols belonging to the second layer 2, the symbols belonging to the second layer 2 are in a state in which interference coming from symbols of the first layers 1-1 and 1-2 is completely cancelled.

Further, the receiver can detect a symbol $S_{k+1}$ having the largest SIR, and can cancel interference caused by the symbol $S_{k+1}$ in symbols $S_k$, $S_{k+2}$ and $S_{k+3}$ in step (b).

Thereafter, the receiver can detect the symbol $S_k$ having the second largest SIR, and can cancel interference caused by the symbol $S_k$ in the symbols $S_{k+3}$ and $S_{k+4}$ in step (c). Further, the receiver can detect the symbol $S_{k+3}$ having the third largest SIR, and can cancel interference caused by the symbol $S_{k+3}$ in the symbol $S_{k+2}$ in step (d). Lastly, the receiver can detect the rest of the symbol $S_{k+2}$.

As described above, when the receiver divides subcarriers into subcarriers of the first layer and subcarriers of the second layer by comparing the region threshold value $\rho_R$ and a channel gain and then performs successive detection only for the second layer, a detection processes needs to be performed by the number of times corresponding to (the number of symbols belonging to the second layer+one), that is, $n_{s,2nd}+1$ (five times in the examples illustrated in FIGS. 9 and 10). That is, one detection process for detecting a symbol of the first layer and an $n_{s,2nd}$ number of times of a detection process for detecting a symbol belonging to the second layer are required. Further, an $n_{s,2nd}$ number of times (four times in the examples illustrated in FIGS. 9 and 10) of an interference cancellation process is required. That is, one interference cancellation process for cancelling interference of a symbol of the second layer, which is caused by a symbol of the first layer, and an $n_{s,2nd}-1$ number of times of an interference cancellation process for cancelling successive interference of the second layer are required.

By the way, in case of the detection method mentioned above, since the number ($n_{s,1st}$) of symbols belonging to the first layer is much larger than the number ($n_{s,2nd}$) of symbols belonging to the second layer ($n_{s,1st} \gg n_{s,2nd}$) in general, the number of sequential detection and interference cancellation can be largely decreased. Therefore, the process time relating to the detection method becomes very short, thereby enabling power consumption to be largely decreased.

As shown below, Table 2 is a table for comparing the number of the existing OSIC with the number of processes of the OSIC according to one embodiment of the present invention. In this case, since a value of N is much larger than a value of $n_{s,2nd}$, the processing efficiency can be raised according to one embodiment of the present invention.

TABLE 2

| | General method | Layered detection method |
|---|---|---|
| Sequentional detection | N times | $n_{s,2nd}+1$ times |
| Interference cancellation | N − 1 times | $n_{s,2nd}$ times |

Hereinabove, the successive interference cancellation method according to one embodiment of the present invention has been described.

Hereinafter, a method for configuring threshold values for layered detection according to one embodiment of the present invention will be described.

As mentioned above, the layered detection configures two kinds of threshold values in order to select a detection scheme suitable for a channel state and select a region in which interference cancellation is to be performed.

First of all, a method for configuring the selection threshold value $\rho_s$ for selecting the detection scheme suitable for the channel state will be described.

The selection threshold value $\rho_s$ can be calculated according to a filter used in a given system and a characteristic of a current channel, in order to guarantee an average SIR (E[SIR]) for a minimum desired channel gain. For example, the selection threshold value $\rho_s$ can be defined by Equation (4) as follows.

$$E[SIR] = 10\log\left(\frac{E[\min(|H_{(m,m),n}|^2)]}{\rho_s}\right) \Rightarrow \rho_s = \frac{E[\min(|H_{(m,m),n}|^2)]}{10^{\frac{E[SIR]}{10}}} \quad (4)$$

That is, the selection threshold value $\rho_s$ can be interpreted as interference for guaranteeing performance in a minimum channel gain. In this way, one-tap equalization can be performed for a channel environment capable of enduring interference by defining the selection threshold value $\rho_s$, and layered detection can be performed for a channel environment not capable of enduring the interference. Through this, unnecessary interference cancellation processes can be minimized.

As a next method, in a case where it is determined that layered detection is performed, a method for configuring the region threshold value $\rho_R$ for selecting a region for performing interference cancellation will be described.

The region threshold value $\rho_R$, for example, can be defined by Equation (5) as follows.

$$\rho_R = \alpha\rho_s, \text{ where } \alpha = \frac{\max(|H_{(m,m),n}|^2)}{\min(|H_{(m,m),n}|^2)} \quad (5)$$

In this case, a constant value a defined by a ratio of a maximum channel gain max($|H_{(m,n),n}|^2$) to a minimum channel gain min($|H_{(m,n),n}|^2$) can be an indicator for a region in which a burst error is to occur in a current channel. Therefore, it is possible to anticipate a maximum interference size for a region in which a burst error is to occur in a current channel by multiplying the constant value a by the selection threshold value $\rho_s$. In this case, when the difference between the maximum channel gain and a minimum channel gain is large, interference becomes large so that the number of a region to which interference cancellation is to be applied may increase. Through this, performance degradation of layered detection can be minimized even while the number of a region to which interference cancellation is to be applied is adaptively decreased according to a channel environment.

Hereinabove, the method for configuring threshold values for layered detection according to one embodiment of the present invention will be described.

Hereinafter, a method for transmitting feedback information for layered detection according to one embodiment of the present invention will be described.

Figure 11:
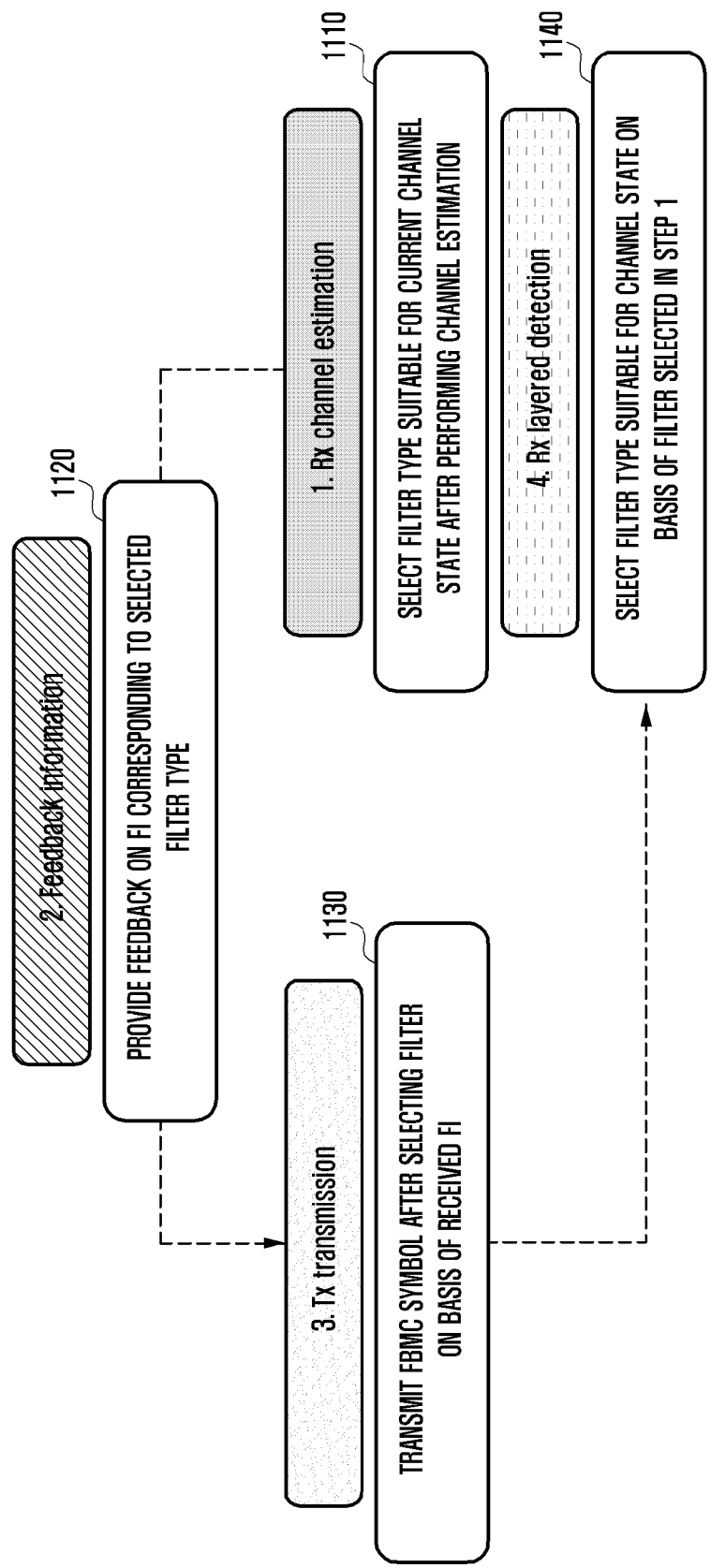
FIG. 11 is a view illustrating a method for transmitting feedback information for layered detection according to one embodiment of the present invention.

FIG. 11 is a view illustrating a method for transmitting feedback information for layered detection according to one embodiment of the present invention.

The QAM signal-based FBMC system using two different filters makes it possible to design a filter suitable for a situation of each channel. For example, performance of filters having strong orthogonality may be excellent in an environment having a small delay spread, and performance of filters optimized for a frequency confinement characteristic may be excellent in an environment having a strong delay spread. Therefore, the transmitter needs to receive the feedback information and a Filter Indicator (FI) from the receiver in order to use a filter suitable for a current channel.

More specifically, the receiver can perform channel estimation and then select a type of a filter suitable for the current channel state in step 1110. Further, the receiver can feedback the FI including information on the filter which the receiver has selected to the transmitter in step 1120.

The transmitter to which the FI including the information on the filter suitable for the current channel state has been fed back from the receiver can select the filter on the basis of the FI which the transmitter has received in step 1130 and transmit a FBMC symbol according to the selected filter.

Meanwhile, in step 1140, the receiver can determine threshold values used for layered detection, i.e. the selection threshold value $\rho_s$ and the region threshold value $\rho_R$, on the basis of the filter which has been selected in step 1110. Further, the receiver performs layered detection of the signal which the transmitter has transmitted, using the predetermined values.

Hereinabove, the method for transmitting feedback information for layered detection according to one embodiment of the present invention has been described.

Hereinafter, a method for transmitting and receiving a signal according to one embodiment of the present invention will be described.

Figure 12:
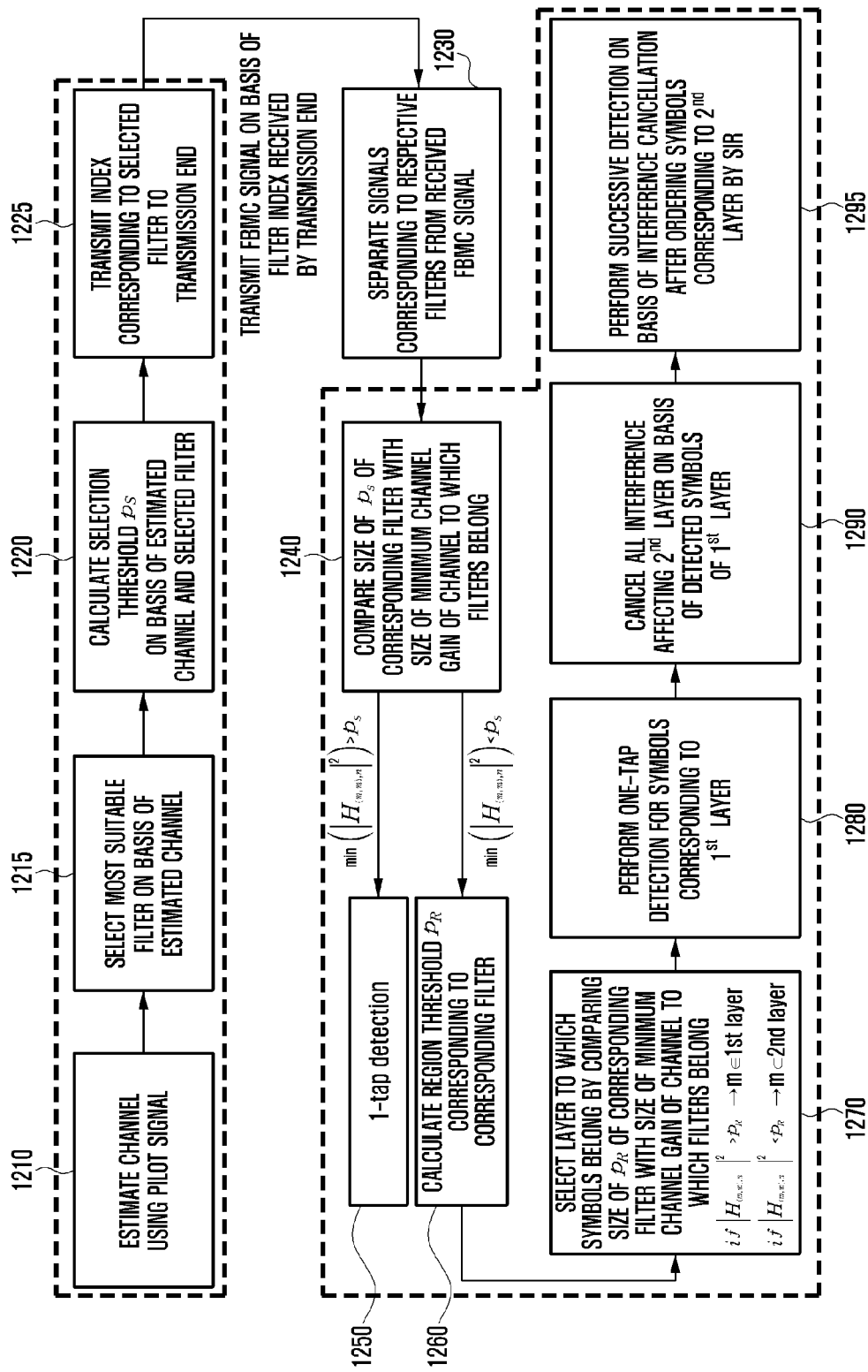
FIG. 12 is a view illustrating a method for transmitting and receiving a signal according to one embodiment of the present invention.

FIG. 12 is a view illustrating a method for transmitting and receiving a signal according to one embodiment of the present invention.

Referring to FIG. 12, the receiver can give the transmitter a feedback on filter information by performing channel estimation and selecting a filter suitable for a current channel. That is, the receiver can estimate a channel, using a pilot channel in step 1210. Thereafter, the receiver can select the most suitable filter on the basis of the channel which the reception has estimated in step 1215. Further, the receiver can calculate at least one of the selection threshold value $\rho_s$ and the region threshold value $\rho_R$ on the basis of the estimated channel and the selected filter in step 1220. Further, the receiver can transmit the information on the selected filter to the transmitter in step 1225. In this case, according to one embodiment, the receiver can feedback identification information such as an index corresponding to the selected filter to the transmitter.

Thereafter, in a case where the transmitter transmits FBMC signals on the basis of the filter information which the transmitter has received from the receiver, the receiver can separate signals corresponding to respective filters from the FBMC signals which the receiver has received in step 1230. Thereafter, the receiver can perform layered detection.

That is, the receiver can compare the selection threshold value $\rho_s$ of the corresponding filter with a size of a minimum gain of the channel to which the filter belongs in step 1240. In a case where a result of the comparison shows that the minimum channel gain is larger than the selection threshold value $\rho_s$, the receiver can perform one-tap equalization in step 1250.

On the other hand, in a case where the minimum channel gain is not larger than the selection threshold value $\rho_s$, the receiver can calculate the region threshold value $\rho_R$ corresponding to the corresponding filter in step 1260.

Further, the receiver can select respective symbols, i.e. a layer to which subcarriers belong by comparing the region threshold value $\rho_R$ of the corresponding filter with the channel gain sizes of the channels in which the filter belongs to in step 1270. For example, in a case where a channel gain size is larger than the region threshold value $\rho_R$, the corresponding symbol can be selected as the first layer, and in a case where the channel gain size is not larger than the region threshold value $\rho_R$, the corresponding symbol can be selected as the second layer.

Thereafter, the receiver can perform one-tap equalization for the symbols corresponding to the first layer in step 1280.

Further, the receiver can cancel interference affecting the second layer on the basis of the detected symbols of the first layer in step 1290. Thereafter, the receiver can order the symbols corresponding to the second layer by a SIR and then perform interference cancellation-based successive detection for the ordered symbols in step 1295.

Since detailed description of each step has been described, the description will be omitted.

Figure 13:
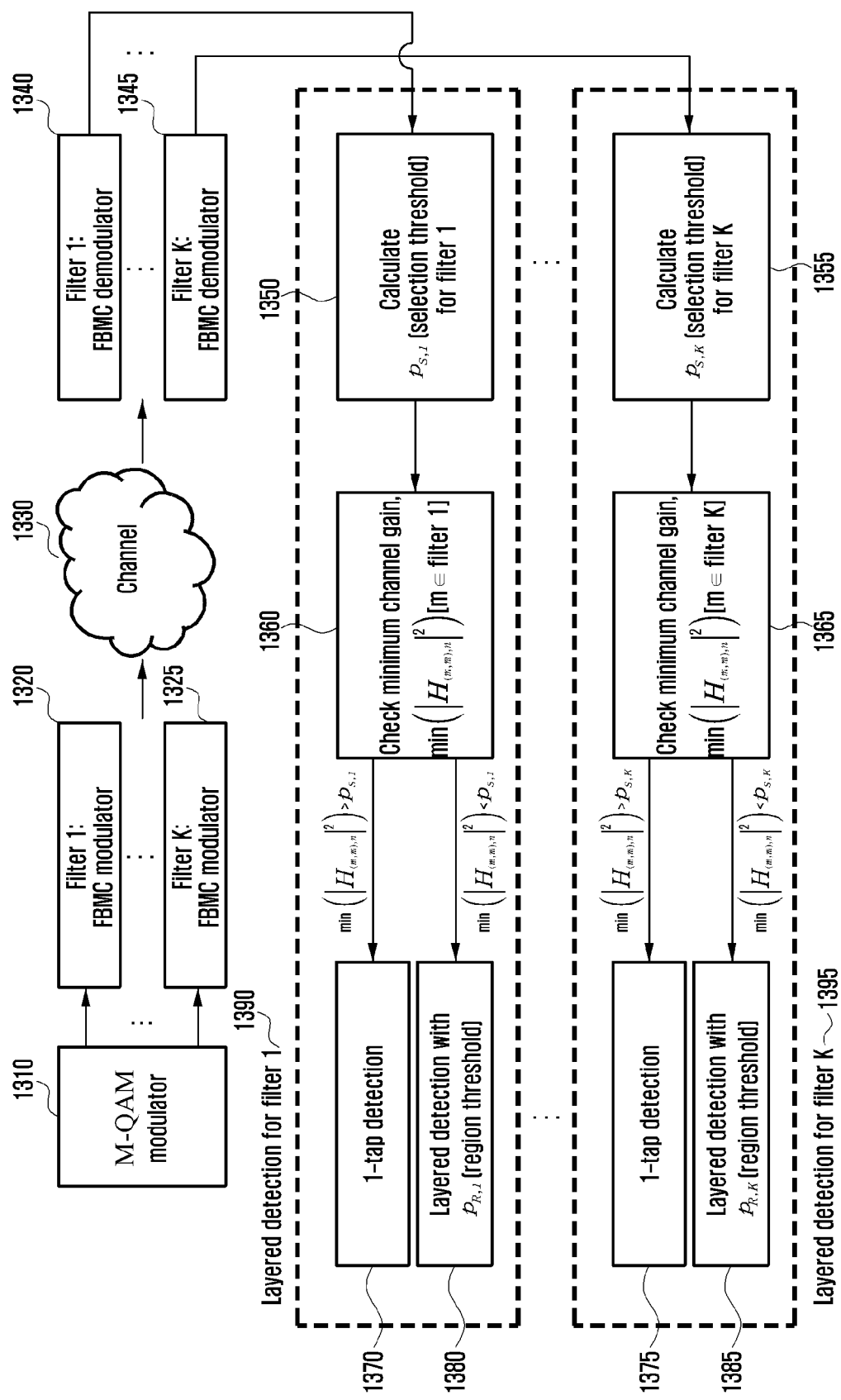
FIG. 13 is a view illustrating another example of a method for transmitting and receiving a signal according to one embodiment of the present invention.

FIG. 13 is a view illustrating another example of a method for transmitting and receiving a signal according to one embodiment of the present invention.

Specifically, FIG. 13 is a view illustrating an operation method regarding a case where a plurality of filters used for the FBMC exists.

Referring to FIG. 13, in a case where the plurality of filters used for the FBMC exists, layered detection can be performed according to each filter.

That is, in a case where the transmitter modulates a signal in an M-QAM modulator in step 1310 and transmits the modulated signals through a first filter (FBMC modulator) in step 1320, the modulated signal can be received by the receiver through a channel 1330. Further, the receiver can receive the signal transmitted through a first filter and perform demodulation (FBMC demodulator) in step 1340, and can perform layered detection for the first filter in step 1390. That is, the receiver calculates a selection threshold value $\rho_{s,1}$ for the first filter in step 1350, and determines whether to perform layered detection according to the selection threshold value $\rho_{s,1}$ in step 1360, thereby enabling performing detection in step 1370 and step 1380.

Further, in a case where the transmitter modulates a signal in step 1310 and transmits the modulated signal through a $K^{th}$ filter (FBMC modulator) in step 1325, the modulated signal can be received to the receiver through the channel 1330. Further, the receiver can receive the signal transmitted through the $K^{th}$ filter and perform demodulation (FBMC demodulator) in step 1345, and can perform layered detection for the $K^{th}$ filter in step 1395. That is, the receiver calculates a selection threshold value $\rho_{s,K}$ for the $K^{th}$ filter in step 1355, and determines whether to perform layered detection according to the selection threshold value $\rho_{s,K}$ in step 1365, thereby enabling performing detection in step 1375 and step 1385.

In this way, in a case where the plurality of filters used for the FBMC exists, layered detection can be performed according to each filter.

Hereinabove, the method for transmitting and receiving a signal according to one embodiment of the present invention has been described.

Hereinafter, a method for transmitting and receiving a signal according to one embodiment of the present invention will be described.

Figure 14A:
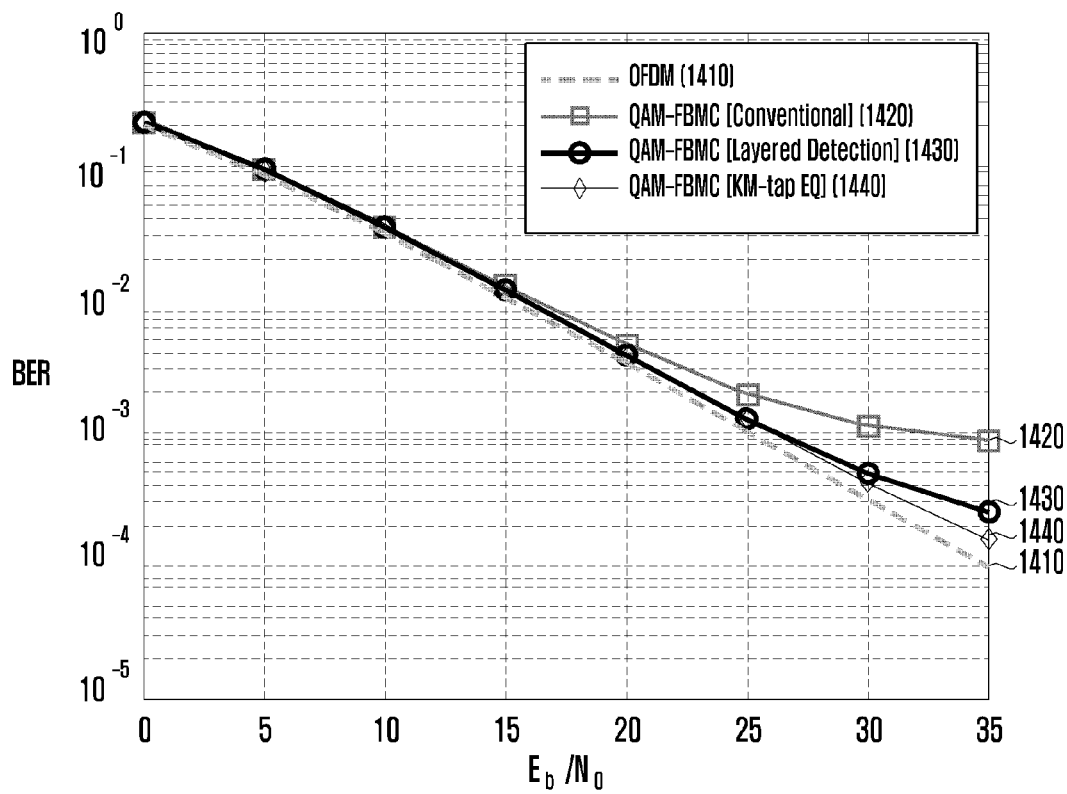
FIG. 14A and FIG. 14B are views schematically illustrating examples of performance according to a method for transmitting and receiving a signal according to one embodiment of the present invention.
Figure 14B:
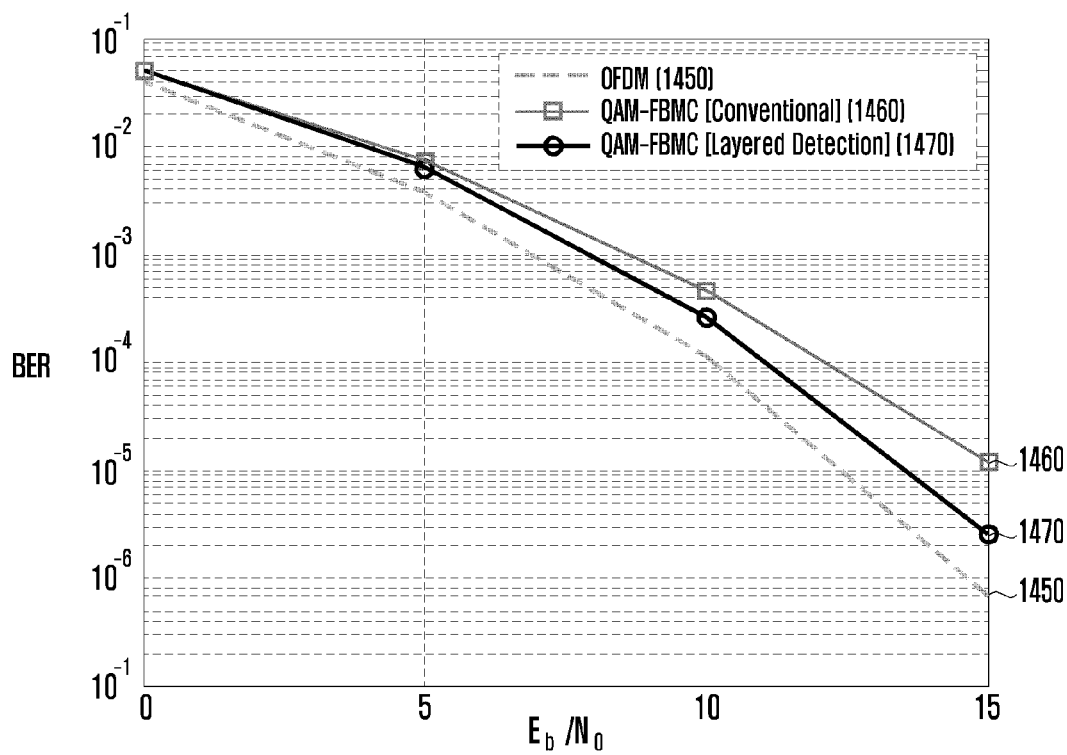

FIG. 14A and FIG. 14B are views for schematically illustrating examples of performance according to a method for transmitting and receiving a signal according to one embodiment of the present invention.

First of all, FIG. 14A is a view illustrating one example of a Bit Error Rate (BER) in an ITU pedestrian channel of a Single Input Single Output (SISO). Referring to FIG. 14A, according to a method for receiving a signal according to one embodiment of the present invention, although interference cancellation-based layered detection is performed only for a particular channel, it can be known that a performance gain is very large compared to the existing symbol level equalizer. That is, since a BER 1430 according to a reception method according to one embodiment of the present invention is lower than a BER 1420 of the existing symbol level equalizer, it can be known that a performance gain is larger than the existing symbol level equalizer. Further, it can be identified that the BER 1430 according to the reception method according to one embodiment of the present invention is not largely different from a BER 1440 of a KM-tap equalizer, and the BER is similar to an OFDM M-tap equalizer 1410 in terms of performance.

Further, FIG. 14B is a view illustrating one example of a BER performance in a MIMO environment. FIG. 14B shows a BER of an OFDM 1450 relative to BERs 1460, 1470. Specifically, it can be identified that, similar to the SISO environment, it is possible to improve performance through layered detection even though the layered detection is performed in a MIMO system according to one embodiment of the present invention. That is, since the BER 1470 according to the reception method of one embodiment of the present invention is larger than an existing symbol level equalizer 1460, it can be identified that a performance gain is larger than the existing symbol level equalizer 1460.

As can be identified in FIGS. 14A and 14B, according to a method for transmitting and receiving a signal according to one embodiment of the present invention, it can be known that the method is a method capable of acquiring a gain in terms of a BER even while maintaining a symbol level equalizer structure.

Figure 15A:
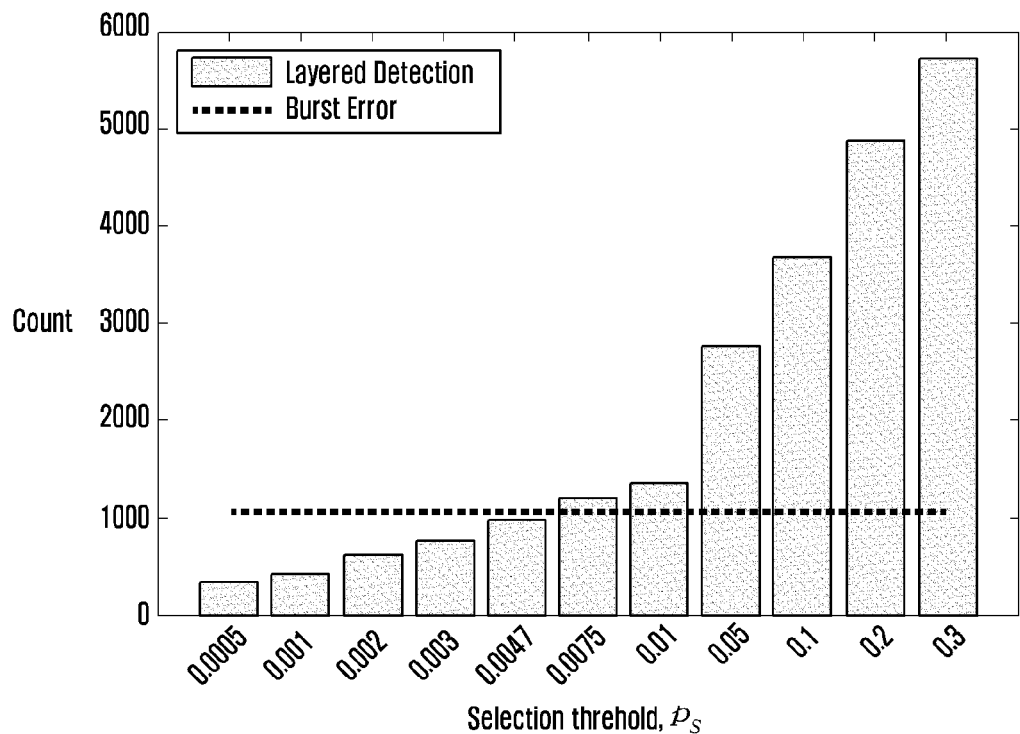
FIG. 15A and FIG. 15B are views schematically illustrating examples of performance according to a threshold value for selecting a detection scheme and a threshold value for selecting a region in which interference cancellation is to be performed according to one embodiment of the present invention.
Figure 15B:
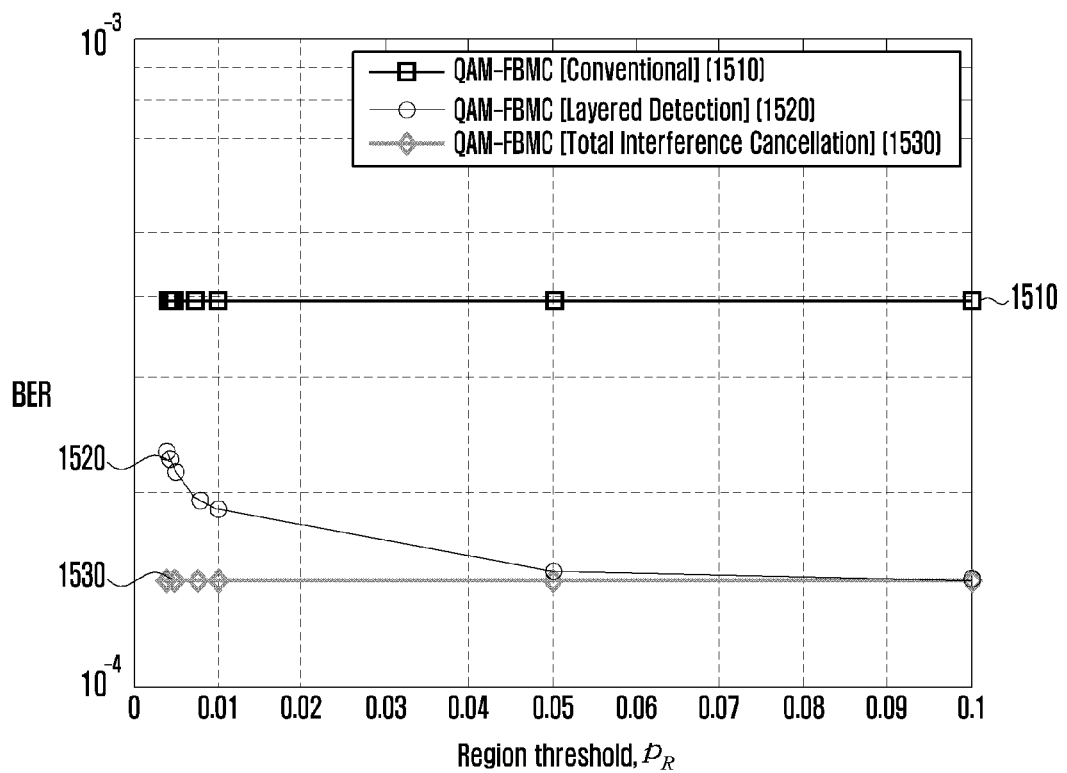

FIG. 15A and FIG. 15B are views schematically illustrating threshold values for selecting a detection scheme according to one embodiment of the present invention, and examples of performance according to a threshold value for selecting a region in which interference cancellation is to be performed.

First of all, FIG. 15A is a graph showing the number of times that a burst error occurs and the number of times that layered detection according to the selection threshold value $\rho_s$ is applied. In an experiment having made 10000 channels occur under the SISO environment, the number of times that a burst error occurs due to residual interference is about 1073, that is, about an 11% chance so that a minimum channel gain may not be guaranteed. Therefore, it can be identified that performing layered detection only for a particular channel environment through the selection threshold value $\rho_s$ is efficient.

Further, when the selection threshold value $\rho_s$ is calculated according to Equation (4) as above in the ITU pedestrian channel, the calculated selection threshold value $\rho_s$ can be defined by Equation (6) as follows.

$$\rho_s = \frac{E[\min(|H_{(n,m),n}|^2)]}{10^{\frac{E[SIR]}{10}}} = \frac{0.47}{100} = 0.0047 \quad (6)$$

When such a calculated selection threshold value $\rho_s$ is compared to a result of graph of FIG. 15A, it can be identified that the selection threshold value $\rho_s$ defined with reference to Equation (4) described above in accordance with the anticipation of a case where an interference cancellation method is needed.

As a next view, FIG. 15B is a view illustrating one example of a BER result according to the region threshold value $\rho_R$. As illustrated in FIG. 15B, it can be identified that the MIMO system cannot have a maximum gain which can be obtained by an interference cancellation method when only the selection threshold value $\rho_s$ is considered. Therefore, a process of selecting a region in which ordered successive detection is to be performed according to the region threshold value $\rho_R$ is required. Especially, according to one embodiment of the present invention, it can be identified that it is possible to obtain desired performance even while largely decreasing complexity, by configuring a region suitable for a current channel as the region in which ordered successive detection is to be performed.

Figure 16:
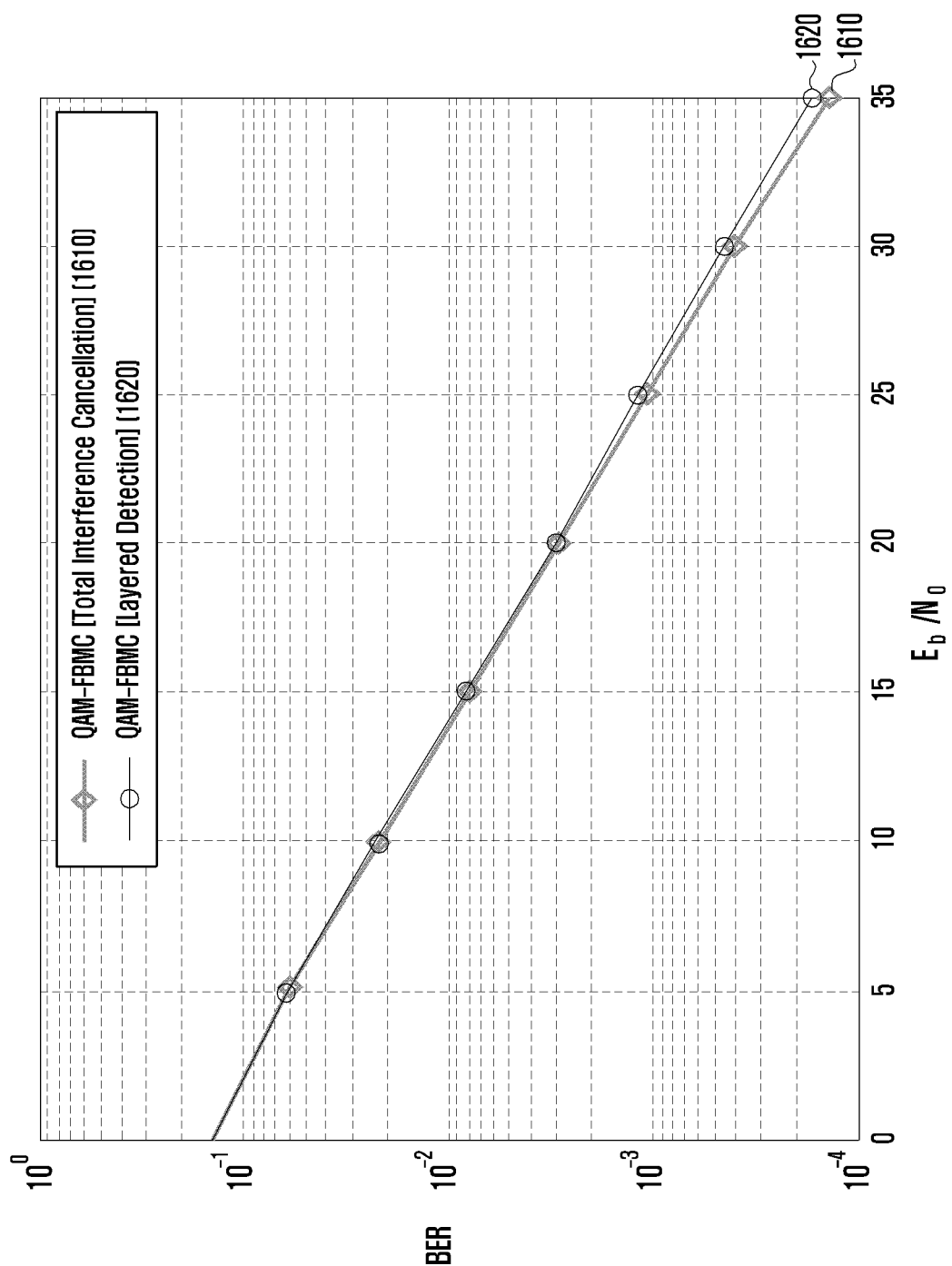
FIG. 16 is a view illustrating examples of a BER according to a method of transmitting and receiving a signal and a BER according to a method of performing entire interference cancellation according to one embodiment of the present invention.

FIG. 16 is a view illustrating one example of a BER according to a method for transmitting and receiving a signal according to one embodiment of the present invention and a BER according to a method for performing entire interference cancellation.

Referring to FIG. 16, a BER 1610 regarding a case of performing interference cancellation for all channels and all regions, without using threshold values for layered detection, is illustrated. Further, according to one embodiment of the present invention, a BER 1620 regarding a case of determining whether to adaptively perform layered detection according to a channel situation and determining a region in which successive detection is to be performed according to the region threshold value $\rho_R$ so as to perform detection according to the determined region is illustrated. In this case, it can be identified that there is little performance difference between a case of performing detection and equalization of a signal according to one embodiment of the present invention and a case of performing interference cancellation for all regions of the entire channels. Therefore, it can be identified that performing layered detection according to a channel situation according to one embodiment of the present invention is excellent in terms of efficiency.

Hereinabove, the method for transmitting and receiving a signal according to one embodiment of the present invention has been described.

Hereinafter, a block diagram for a receiver and a transmitter according to one embodiment of the present invention will be schematically described.

Figure 17:
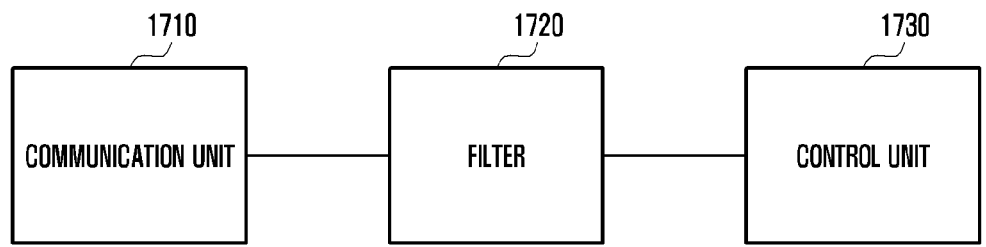
FIG. 17 is one example of a block diagram for a receiver according to one embodiment of the present invention.

FIG. 17 is one example of a block diagram for a receiver according to one embodiment of the present invention.

Referring to FIG. 17, the receiver according to one embodiment of the present invention may include a communication unit 1710, and a control unit 1730 for controlling general operations of the receiver. Further, the receiver may further include a filter 1720.

The control unit 1730 of the receiver controls the receiver to perform an operation corresponding to one of the embodiments described above. For example, the control unit 1730 can control to perform channel estimation, compare a minimum channel gain with a predetermined first threshold value, and perform layered detection when the minimum channel gain is smaller than the first threshold value. Further, the control unit 1730 can control to perform interference cancellation-based detection for a second layer corresponding to a region in which a channel gain is smaller than a predetermined second threshold value.

Further, the communication unit 1710 of the receiver receives a signal according to an operation corresponding to one of the embodiments described above. For example, the communication unit 1710 can receive a signal from the transmitter, and can transmit information on the filter selected according to the estimated channel to the transmitter.

Figure 18:
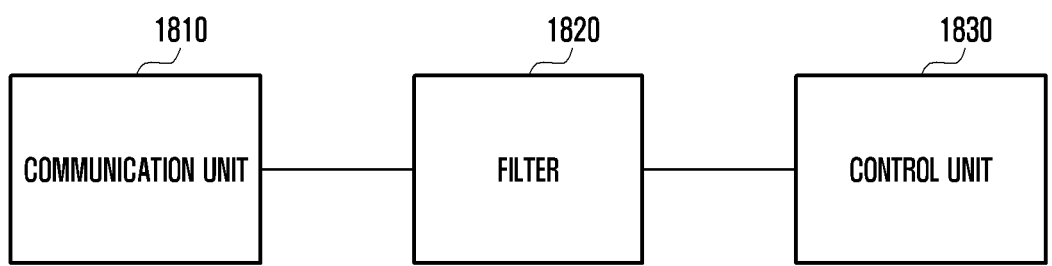
FIG. 18 is one example of a block diagram for a transmitter according to one embodiment of the present invention.

FIG. 18 is one example of a block diagram for a transmitter according to one embodiment of the present invention.

Referring to FIG. 18, the receiver according to one embodiment of the present invention may include a communication unit 1810, and a control unit 1830 for controlling general operations of the transmitter. Further, the transmitter may further include a filter 1820.

The control unit 1830 of the transmitter controls the transmitter to perform an operation corresponding to one of the embodiments described above. For example, the control unit 1830 can control to receive a feedback on information on a filter from the receiver, select the filter 1820 according to the information, and transmit a FBMC symbol using the selected filter 1820.

Further, the communication unit 1810 of the transmitter transmits and receives a signal according to an operation corresponding to one of the embodiments described above. For example, the communication unit 1810 can transmit the FBMC symbol to the transmitter, and can receive information on the filter 1820 which the receiver has selected according to a channel state from the receiver.

Hereinabove, the block diagram for the receiver and the transmitter according to one embodiment of the present invention has been described.

The embodiments disclosed herein and shown in the drawings are merely particular examples to easily describe the technical details of the present disclosure and assist in understanding of the present disclosure, and are not intended to limit the scope of the present disclosure. It is obvious to those skilled in the art to which the present invention pertains that other modified embodiments on the basis of the spirits of the present invention besides the embodiments disclosed herein can be carried out.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

What is claimed is:

1. A method for receiving a signal by a receiver, the method comprising:
   performing channel estimation;
   comparing a minimum channel gain obtained based on a channel estimation result with a predetermined first threshold value; and
   performing detection by using different detection processes identified based on a layer which is determined according to a second threshold, when the minimum channel gain is smaller than the first threshold value.

2. The method of claim 1, wherein the performing the detection further comprises performing interference cancellation-based detection for a second layer corresponding to a region having a channel gain smaller than a predetermined second threshold value, wherein the interference cancellation-based detection is performed by canceling an interference generated based on symbols of a first layer.

3. The method of claim 2, wherein the performing the detection further comprises performing detection for a first layer corresponding to a region having the channel gain larger than the second threshold value.

4. The method of claim 3, wherein the performing the detection further comprises cancelling interference affecting the second layer, using the subcarriers detected in the first layer.

5. The method of claim 2, wherein the performing the interference cancellation-based detection further comprises: ordering subcarriers corresponding to the second layer by a Signal to Interference Ratio (SIR); and sequentially performing successive interference cancellation for the ordered subcarriers corresponding to the second layer in an order from a subcarrier having a large SIR.

6. The method of claim 2, further comprising:
   configuring the second threshold value according to the following equation, $$\rho_R = \alpha\rho_s, \text{ where } \alpha = \frac{\max(|H_{(m,m),n}|^2)}{\min(|H_{(m,m),n}|^2)}$$

wherein $\min(|H_{(m,n),n}|^2)$ denotes a minimum channel gain, $\max(|H_{(m,n),n}|^2)$ denotes a maximum channel gain, $\rho_s$ denotes the first threshold value, and $\rho_R$ denotes the second threshold value.

7. The method of claim 1, further comprising:
   configuring the first threshold value according to the following equation, $$E[SIR] = 10\log\left\{\frac{E[\min(|H_{(m,m),n}|^2)]}{\rho_s}\right\} \Rightarrow \rho_s = \frac{E[\min(|H_{(m,m),n}|^2)]}{10^{\frac{E[SIR]}{10}}}$$

wherein E[SIR] denotes an average SIR, $E[\min(|H_{(m,n),n}|^2)]$ denotes a minimum channel gain, and $\rho_s$ denotes the first threshold value.

8. The method of claim 1, further comprising:
performing the channel estimation;
selecting an optimal filter type according to the estimated channel state; and
transmitting information on the selected filter to a transmitter.

9. The method of claim 8, wherein the comparing of the minimum channel gain with the first threshold value further includes configuring the first threshold value using the information on the filter.

10. The method of claim 1, further comprising performing detection using a one-tap equalizer, when the minimum channel gain is not smaller than the first threshold value.

11. A receiver comprising:
a communication unit that transmits and receives a signal to/from a transmitter; and
a controller configured to perform channel estimation, compare a minimum channel gain obtained based on a channel estimation result with a predetermined first threshold value, and perform detection by using different detection processes identified based on a layer which is determined according to a second threshold, when the minimum channel gain is smaller than the first threshold value.

12. The receiver of claim 11, wherein the controller is configured to perform interference cancellation-based detection for a second layer corresponding to a region having a channel gain smaller than a predetermined second threshold value, wherein the interference cancellation-based detection is performed by canceling an interference generated based on symbols of a first layer.

13. The receiver of claim 12, wherein the controller is configured to perform detection for a first layer corresponding to a region having a channel gain larger than the second threshold value, using a one-tap equalizer.

14. The receiver of claim 13, wherein the controller is configured to cancel interference affecting the second layer using the subcarriers detected in the first layer.

15. The receiver of claim 12, wherein the controller is configured to order subcarriers corresponding to the second layer by a Signal to Interference Ratio (SIR) and perform successive interference cancellation for the ordered subcarriers corresponding to the second layer in the sequential order from a subcarrier having a large SIR.

16. The receiver of claim 12, wherein the controller is configured to configure the second threshold value according to the following equation, $$\rho_R = \alpha \rho_s, \text{ where } \alpha = \frac{\max(|H_{(m,m),n}|^2)}{\min(|H_{(m,m),n}|^2)}$$

wherein $\min(|H_{(m,n),n}|^2)$ denotes a minimum channel gain, $\max(|H_{(m,n),n}|^2)$ denotes a maximum channel gain, $\rho_s$ denotes the first threshold value, and $\rho_R$ denotes the second threshold value.

17. The receiver of claim 11, wherein the controller is configured to configure the first threshold value according to the following equation, $$E[SIR] = 10\log\left\{\frac{E[\min(|H_{(m,m),n}|^2)]}{\rho_s}\right\} \Rightarrow \rho_s = \frac{E[\min(|H_{(m,m),n}|^2)]}{10^{\frac{E[SIR]}{10}}}$$

wherein E[SIR] denotes an average SIR, $E[\min(|H_{(m,n),n}|^2)]$ denotes an average minimum channel gain, $\max(|H_{(m,n),n}|^2)$ denotes a maximum channel gain, and $\rho_s$ denotes the first threshold value.

18. The receiver of claim 11, wherein the controller is configured to perform the channel estimation, select an optimal filter type according to the estimated channel state and transmit the information on the selected filter to a transmitter.

19. The receiver of claim 11, wherein the controller is configured to configure the first threshold value using information the filter.

20. The receiver of claim 11, wherein the controller is configured to perform detection using a one-tap equalizer, when the minimum channel gain is not smaller than the first threshold value.

* * * * *

UNITED STATES PATENT AND TRADEMARK OFFICE
CERTIFICATE OF CORRECTION

Page 1 of 1

PATENT NO. : 9,654,312 B2
APPLICATION NO. : 14/802540
DATED : May 16, 2017
INVENTOR(S) : Dongkyu Sim, Chungyong Lee and Taeyoung Kim It is certified that error appears in the above-identified patent and that said Letters Patent is hereby corrected as shown below:

On the Title Page

Please delete:
"(73) Assignee: Samsung Electronics Co., Ltd. (KR)"

And insert:
--(73) Assignee: Samsung Electronics Co., Ltd. (KR)
　　　　　　　 Industry-Academic Cooperation Foundation, Yonsei University (KR)--

Signed and Sealed this
Fifth Day of March, 2019

Andrei Iancu
*Director of the United States Patent and Trademark Office*